US011334245B1

(12) United States Patent
Hormuth et al.

(10) Patent No.: US 11,334,245 B1
(45) Date of Patent: May 17, 2022

(54) NATIVE MEMORY SEMANTIC REMOTE MEMORY ACCESS SYSTEM

(71) Applicant: Dell Products L.P., Round Rock, TX (US)

(72) Inventors: Robert W. Hormuth, Cedar Park, TX (US); Jimmy D. Pike, Georgetown, TX (US); Elie Jreij, Pflugerville, TX (US); Gaurav Chawla, Austin, TX (US); Mark Steven Sanders, Roanoke, VA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/085,133

(22) Filed: Oct. 30, 2020

(51) Int. Cl.
*G06F 3/06* (2006.01)

(52) U.S. Cl.
CPC .......... *G06F 3/0604* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| 8,270,196 B2 | 9/2012 | Norman |
| 10,346,042 B2 | 7/2019 | Stabrawa et al. |
| 2020/0326891 A1* | 10/2020 | Luo .......... G06F 12/10 |

OTHER PUBLICATIONS

Ruggles, Gary "Introducing the Compute Express Link (CXL) standard: the hardware," Tech Design Forum, Posted: Sep. 11, 2019, 2 Pages https://www.techdesignforums.com/practice/technique/compute-express-link-cxl-hardware/.

* cited by examiner

*Primary Examiner* — Jane Wei
(74) *Attorney, Agent, or Firm* — Joseph Mencher

(57) ABSTRACT

A clustered memory system includes a first computing system coupled to a second computing system via a network, and including a clustered memory management subsystem coupled to a central processing subsystem and a networking device. The clustered memory management subsystem receives a processor memory-centric access request associated with a memory access operation from the central processing subsystem, and uses memory management hardware to determine that the processor memory-centric access request is directed to a second memory subsystem in the second computing system. The clustered memory management subsystem then uses remote memory access hardware to generate memory access information for performing the memory access operation at the second memory subsystem, and instructs the networking device to utilize the memory access information to transmit at least one memory access communication that provides for the performance of the memory access operation at the second memory subsystem.

20 Claims, 21 Drawing Sheets

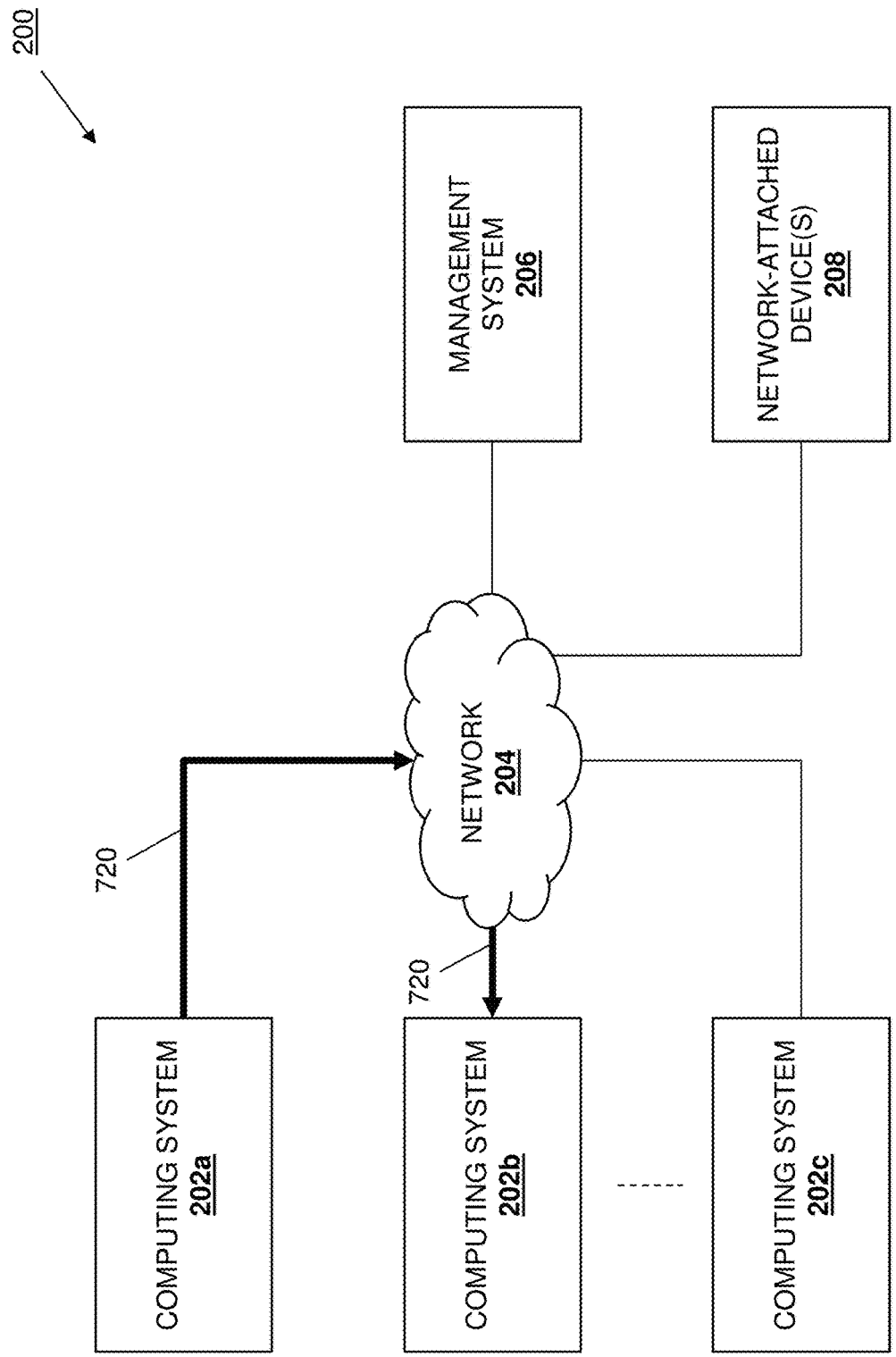

US 11,334,245 B1

NATIVE MEMORY SEMANTIC REMOTE MEMORY ACCESS SYSTEM

BACKGROUND

The present disclosure relates generally to information handling systems, and more particularly to providing clustered memory in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing systems known in the art, may be provided in "clusters" such that applications in any particular server device have "local" access to memory subsystems included in that server device, as well as "remote" access to memory subsystems that are remote to that server device (e.g., in another server device and/or otherwise coupled to that server device via a network). In conventional clustered memory systems, the local memory subsystems in any server device is accessible by applications in that server device via the use of conventional memory pointer access techniques/native memory semantics utilized by the processing system (e.g., an x86 processor) in that server device, while the remote memory subsystems require the utilization of remote memory access software (e.g., middleware, libraries, sockets, etc.) by that processing system in order to generate remote memory access communications, which raises some issues. For example, remote memory access software on processing systems may perform remote memory access operations over a network (e.g., by generating Remote Direct Memory Access (RDMA) communications via RDMA protocols and/or Ethernet communications via Ethernet protocols that may utilize an Application Programming Interface (API) mechanism with the middleware/libraries/sockets discussed above to provide for the accessing of remote memory subsystems (e.g., by allowing the processing system to call function(s) to read a remote memory address, and the performing of those function(s) to program a network controller in a networking device (e.g., a Network Interface Controller (NIC) device) to perform RDMA and/or Ethernet communications that result in remote memory operations at that remote memory address).

As will be appreciated by one of skill in the art, the remote memory subsystem access operations discussed above are not "true" memory reference operations (i.e., memory pointer access techniques/native memory semantics utilized by a processing system) like the local memory subsystem access operations that utilize pointers that point to an address in a local memory subsystem that will be read from or written to. Furthermore, the networking devices that couple their server devices to the network are connected to components in that server device via a Peripheral Component Interconnect express (PCIe) bus and "behind" an Input/Output Memory Management Unit (I/O MMU), thus preventing "pure" MMU memory access, and requiring the remote memory access software discussed above. As will be appreciated by one of skill in the art in possession of the present disclosure, it would be relatively easier for an application programmer to configure an application to utilize a shared memory pool of local and remote memory subsystems using memory pointer access techniques/native memory semantics, rather than having to program or integrate with the remote memory subsystem software discussed above to generate remote memory access communications from function calls.

Accordingly, it would be desirable to provide a clustered memory system that addresses the issues discussed above.

SUMMARY

According to one embodiment, an Information Handling System (IHS) may include a secondary processing subsystem; and a secondary memory subsystem that is coupled to the secondary processing subsystem and that includes instructions that, when executed by the secondary processing subsystem, cause the secondary processing subsystem to provide a clustered memory management engine that is configured to: receive, from a central processing subsystem, a first processor memory-centric access request associated with a first memory access operation; determine, using memory management hardware included in the secondary processing subsystem, that the first processor memory-centric access request is directed to a first memory subsystem in a first computing system that is coupled to the secondary processing subsystem via a network; generate, using remote memory access hardware included in the secondary processing subsystem, first memory access information for performing the memory access operation at the first memory subsystem; and instruct a networking device coupled to the secondary processing subsystem to utilize the first memory access information to perform the first memory access operation at the first memory subsystem to cause the networking device to transmit at least one first memory access communication that provides for the performance of the first memory access operation at the first memory subsystem.

BRIEF DESCRIPTION OF THE DRAWINGS

FIG. 7J is a schematic view illustrating an embodiment of the networked system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
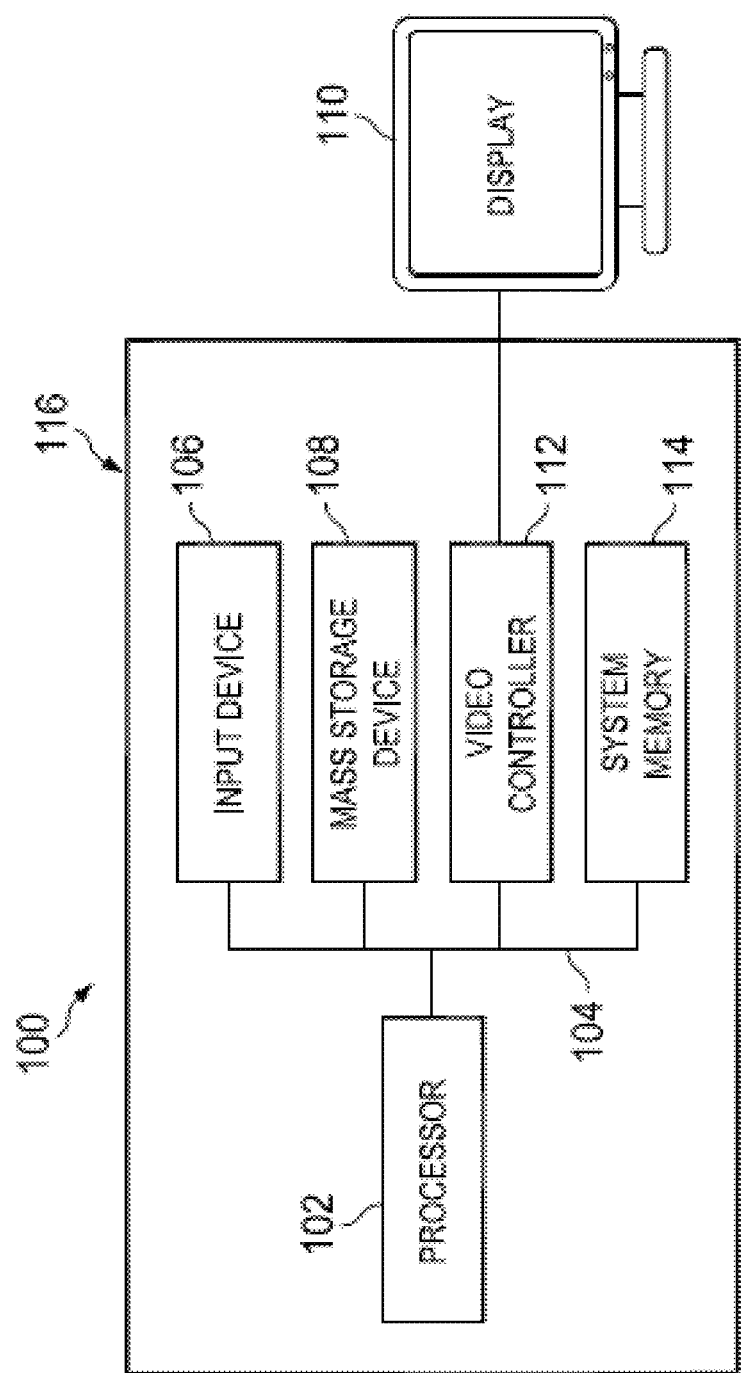
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
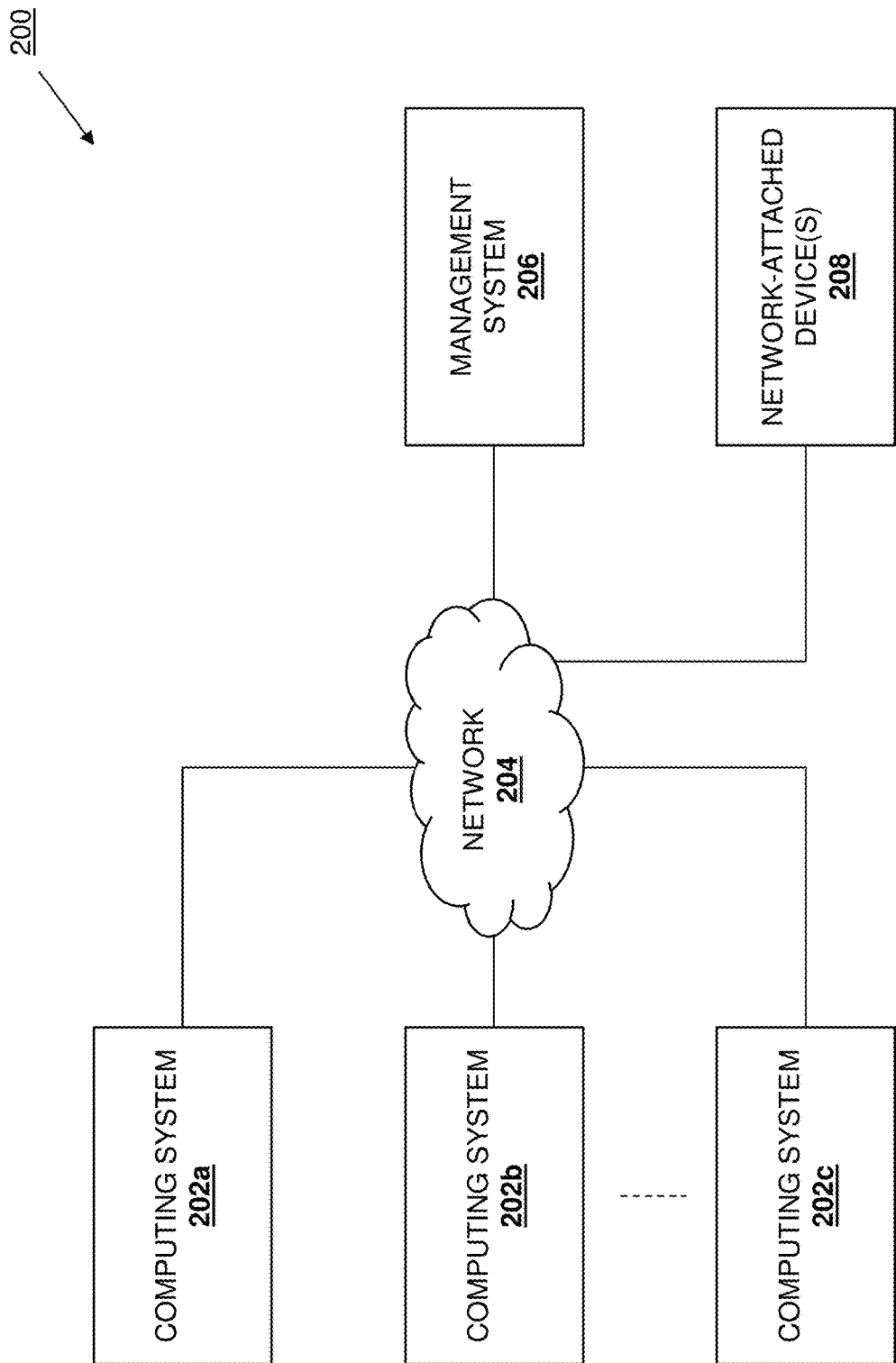
FIG. 2 is a schematic view illustrating an embodiment of a networked system.

Referring now to FIG. 2, an embodiment of a networked system 200 is illustrated in which the clustered memory system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202a-202c and/or the SCP subsystems in those computing systems (e.g., the SCP manager for the SCP subsystems discussed in further detail below). In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples may be provided by one or more Non-Volatile Memory express (NVMe) storage devices that may be configured to provide a network-attached storage system for any or all of the computing systems 202a-202c. However, while a specific networked system 200 has been illustrated and described, one of skill in the art in possession of the present disclosure will recognize that the clustered memory system of the present disclosure may be utilized with a variety of components and component configurations, and/or may be provided in a variety of computing system/network configurations, while remaining within the scope of the present disclosure as well.

Figure 3:
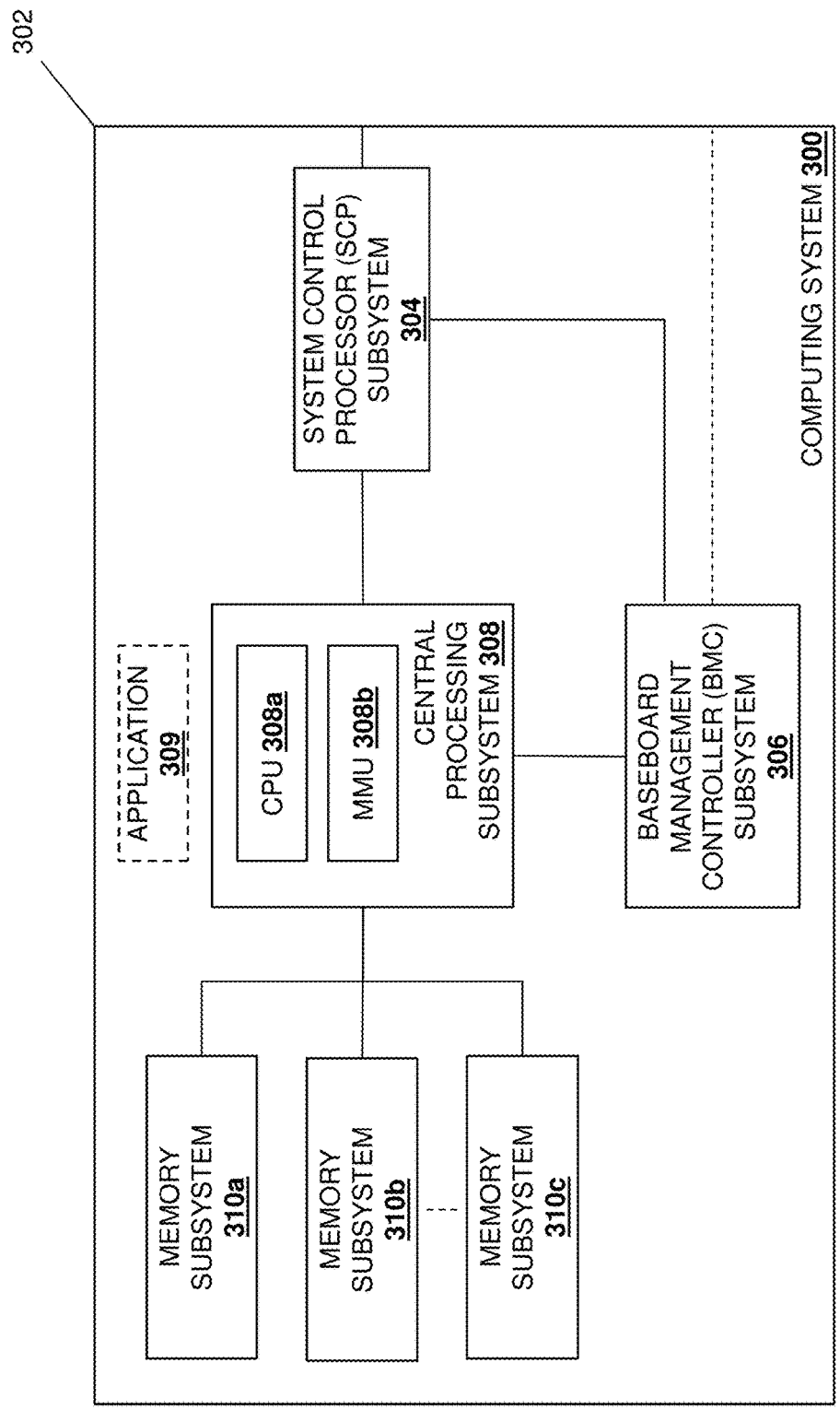
FIG. 3 is a schematic view illustrating an embodiment of a computing system that may be included in the networked system of FIG. 2 and that may utilize the clustered memory functionality of the present disclosure.

Referring now to FIG. 3, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing systems that are configured to operate similarly as the computing system 300 discussed below. In the illustrated embodiment, the computing system 300 includes a chassis 302 that houses the components of the computing system 300, only some of which are illustrated and discussed below.

For example, the chassis 302 may house a clustered memory management subsystem that, in the embodiments illustrated and discussed below, may be provided by a System Control Processor (SCP) subsystem 304 that is provided according to the teachings of the present disclosure to perform the clustered memory management functionality that is discussed in further detail below. In some examples, the SCP subsystem 304 may be conceptualized as an "enhanced" SmartNIC device that may be configured to perform functionality that is not available in conventional SmartNIC devices such as, for example, the platform root-of-trust functionality described by the inventors of the present disclosure in U.S. patent application Ser. No. 17/027,835, filed on Sep. 22, 2020, and the secure communication functionality described by the inventors of the present disclosure in U.S. patent application Ser. No. 17/079,737, filed on Oct. 26, 2020, the disclosures of which is incorporated herein by reference in their entirety. However, while the clustered memory management subsystem that enables the clustered memory management functionality according to the teachings of the present disclosure is illustrated and described as an enhanced SmartNIC device provided by an SCP subsystem, one of skill in the art in possession of the present disclosure will appreciated that the clustered memory management functionality described herein may be enabled on other devices while remaining within the scope of the present disclosure as well.

In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

In an embodiment, the chassis 302 may also house the Baseboard Management Controller (BMC) subsystem 306 that is coupled to the SCP subsystem 304, and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure. As such, the BMC subsystem 310 may be configured to utilize a dedicated management network connection (e.g., illustrated by the dashed line in FIG. 3), or may be configured to utilize a network connection included in the SCP subsystem 304 (e.g., via a Network Communications Services Interface (NCSI) that allows the use of a NIC port on a NIC device in the SCP subsystem 304).

The chassis 302 may also house a central processing system 308 that is coupled to the SCP subsystem 304 and the BMC subsystem 306, and which may include one or more Central Processing Units (CPUs) 308a (e.g., an x86 host processor provided by the processor 102 discussed above with reference to FIG. 1) and/or other processing components that would be apparent to one of skill in the art in possession of the present disclosure, a Memory Management Unit (MMU) 308b, dedicated memory subsystems, and/or other central processing subsystem components that would be apparent to one of skill in the art in possession of the present disclosure. As discussed below, the dedicated memory subsystems in the central processing subsystem 308 may include instructions that, when executed by the CPU(s) 308a in the central processing subsystem 308, cause the CPU(s) 308a to provide one or more applications 309 (e.g., an operating system, applications provided via an operating system, and/or other applications known in the art) that are configured to utilize the clustered memory system as discussed below.

The chassis 302 may also house a plurality of memory subsystems 310a, 310b, and up to 310c, each of which is coupled to the central processing subsystem 308 and any of which may provide one or more of the dedicated processor memory subsystems discussed above. For example, any of the memory subsystems 310a-310c may be provided by Storage Class Memory (SCM) devices (e.g., "host" SCM devices utilized by the central processing subsystem 308 provided by a x86 host processing system), Dual Data Rate (DDR) memory devices (e.g., "host" DDR memory devices utilized by the central processing subsystem 308 provided by a x86 host processing system), and/or any other memory subsystems/devices/technology that would be apparent to one of skill in the art in possession of the present disclosure. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, in some embodiments, the BMC subsystem 306 described above with reference to FIG. 3 may be omitted, and the SCP subsystem 304 may be configured to provide a BMC subsystem that performs the functionality of the BMC subsystem 306 in FIG. 3.

Figure 4:
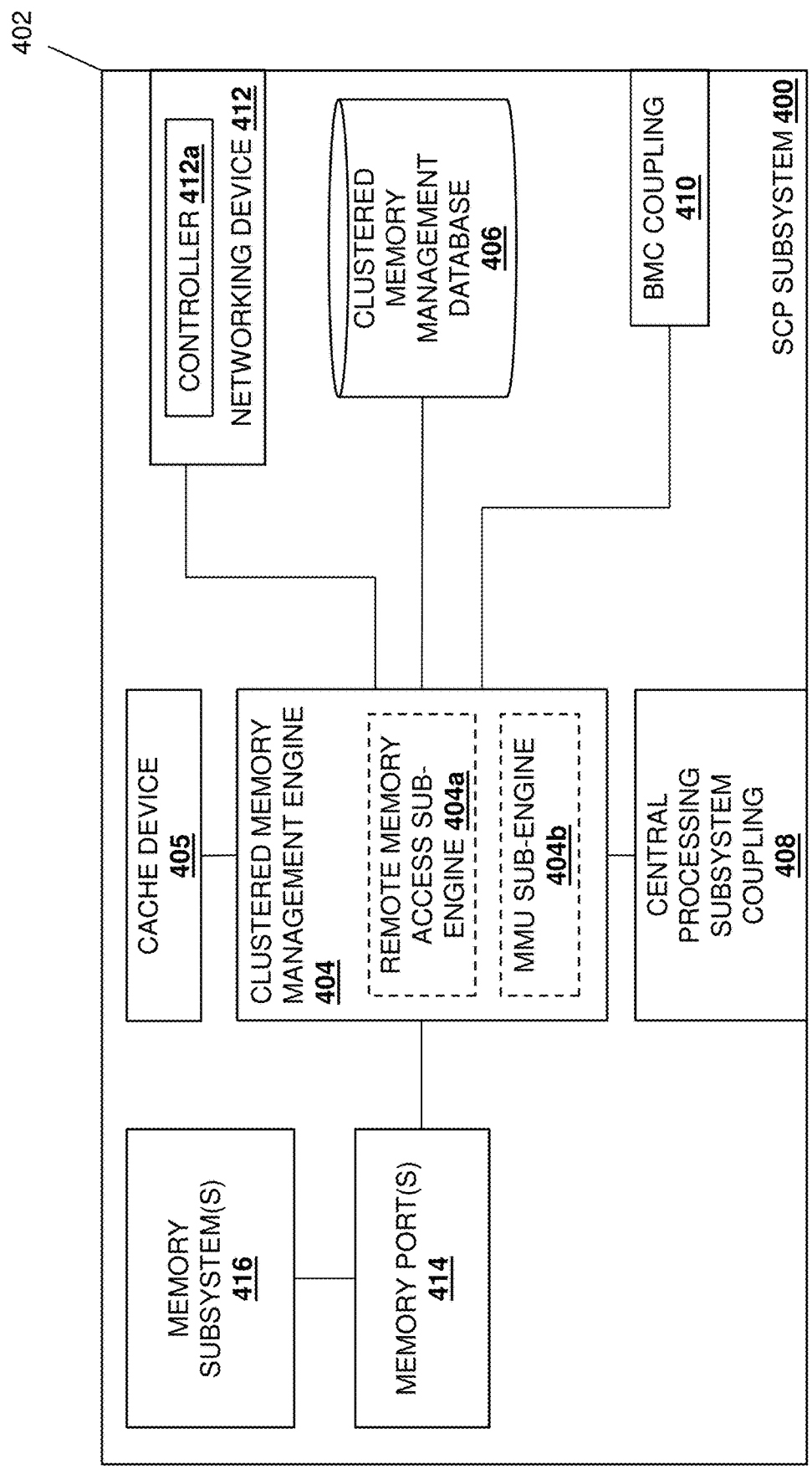
FIG. 4 is a schematic view illustrating an embodiment of a System Control Processor (SCP) subsystem that may be included in the computing system of FIG. 3 and that may provide the clustered memory functionality of the present disclosure.

With reference to FIG. 4, an embodiment of an SCP subsystem 400 is illustrated that may provide the SCP subsystem 304 discussed above with reference to FIG. 3. As such, the SCP subsystem 400 may be provided by the IHS 100 discussed above with reference to FIG. 1 and/or may include some or all of the components of the IHS 100, and in specific examples may be provided as an SCP card, may be integrated into a motherboard, and/or may be provided as a separate/co-motherboard circuit board. However, while illustrated and discussed as being provided in different manners in a computing system 300, one of skill in the art in possession of the present disclosure will recognize that the functionality of the SCP subsystem 400 discussed below may be provided by other devices that are configured to operate similarly as the SCP subsystem 400 discussed below.

In the illustrated embodiment, the SCP subsystem 400 includes a chassis 402 (e.g., a circuit board) that supports the components of the SCP subsystem 400, only some of which are illustrated below. For example, the chassis 402 may support a secondary processing subsystem (which may be distinguished from the central processing subsystem 308 in the computing system 300 discussed herein) such as a networking/management processing subsystem (e.g., an SCP processing subsystem) including one or more networking/management processors (not illustrated, but which may include the processor 102 discussed above with reference to FIG. 1), and a secondary memory subsystem such as a networking/management memory subsystem (e.g., an SCP memory subsystem, not illustrated, but which may include the memory 114 discussed above with reference to FIG. 1) that is coupled to the secondary processing system and that includes instructions that, when executed by the secondary processing system, cause the secondary processing system to provide a clustered memory management engine 404 that is configured to perform the functionality of the clustered memory management engines and/or SCP subsystems discussed below.

In the illustrated embodiments, the clustered memory management engine 404 may include a remote memory access sub-engine 404a that may be provided by a hardware subsystem (e.g., a hardware accelerator device such as a high-speed state machine) that may be part of (or coupled to) the secondary processing/memory subsystems, and that is configured (e.g., a dedicated hardware accelerator device) or configurable (e.g., a Field Programmable Gate Array (FPGA) device) to perform the remote memory access operations described in further detail below. Furthermore, the clustered memory management engine 404 may also include an MMU sub-engine 404b that may be provided by a hardware subsystem (e.g., a hardware accelerator device) that may be part of (or coupled to) the secondary processing/memory subsystems, and that is configured (e.g., a dedicated hardware accelerator device) or configurable (e.g., a Field Programmable Gate Array (FPGA) device) to perform the MMU operations described in further detail below. As will be appreciated by one of skill in the art in possession of the present disclosure, the hardware subsystems that provide the remote memory access sub-engine 404a and the MMU sub-engine 404b may provide for relative high speed, dedicated remote memory access operations and MMU operations, respectively, relative to conventional clustered memory systems in which such functionality is enabled via software executed by the x86 host processor.

In the illustrated embodiment, the chassis 402 may also support a cache device 405 that is coupled to the clustered memory management engine 404 and that is configured to store cached data associated with previous memory access operations, discussed in further detail below. The chassis 402 may also support a central processing subsystem coupling 408 that may be connected to the central processing subsystem 308 in the computing system 300, and that may include the one or more Compute Express Link (CxL) root.mem/.cache Base Address Register (BAR) windows discussed below, and/or other central processing subsystem coupling components that would be apparent to one of skill in the art in possession of the present disclosure.

The chassis 402 may also support a storage system (not illustrated, but which may include the storage 108 discussed above with reference to FIG. 1, a Static Random Access Memory (SRAM), etc.) that is coupled to the clustered memory management engine 404 (e.g., via a coupling between the storage system and the secondary processing subsystem) and that may include a clustered memory management database 406 that is configured to store any of the information utilized by the clustered memory management engine 404 discussed below. The chassis 402 may also support a BMC coupling 410 such as, for example, an Out-Of-Band (OOB) management coupling that is configured to connect to the BMC subsystem 306 discussed above with reference to FIG. 3. The chassis 402 may also support a networking device 412 (e.g., a Network Interface Controller (NIC) device) that is coupled to the clustered memory management engine 404 (e.g., via a coupling between the communication system 412 and the secondary processing subsystem), that includes a controller 412a (e.g., an Ethernet controller), and that may connect the SCP subsystem 304/400 to the network 204 discussed above with reference to FIG. 2. As will be appreciated by one of skill in the art in possession of the present disclosure, the networking device 412 may also include wireless communication systems (e.g., BLUETOOTH®, Near Field Communication (NFC) components, WiFi components, etc.), component connections to computing system components (e.g., the central processing subsystem 308) in the computing system 300, and/or any other communication components that would be apparent to one of skill in the art in possession of the present disclosure.

The chassis 402 may also support one or more memory subsystems 416 that are coupled to the clustered memory management engine 404 via one or more memory port(s) 414 (e.g., CxL "host" ports). For example, any of the memory subsystems 416 may be provided by SCM devices (e.g., "SCP" SCM devices), DDR memory devices (e.g., "SCP" DDR memory devices), and/or any other memory subsystems/devices/technology that would be apparent to one of skill in the art in possession of the present disclosure. However, while a specific SCP subsystem 400 has been illustrated and described, one of skill in the art in possession of the present disclosure will recognize that SCP subsystems (or other devices operating according to the teachings of the present disclosure in a manner similar to that described below for the SCP subsystem 400) may include a variety of components and/or component configurations for providing the functionality discussed below while remaining within the scope of the present disclosure as well.

Figure 5:
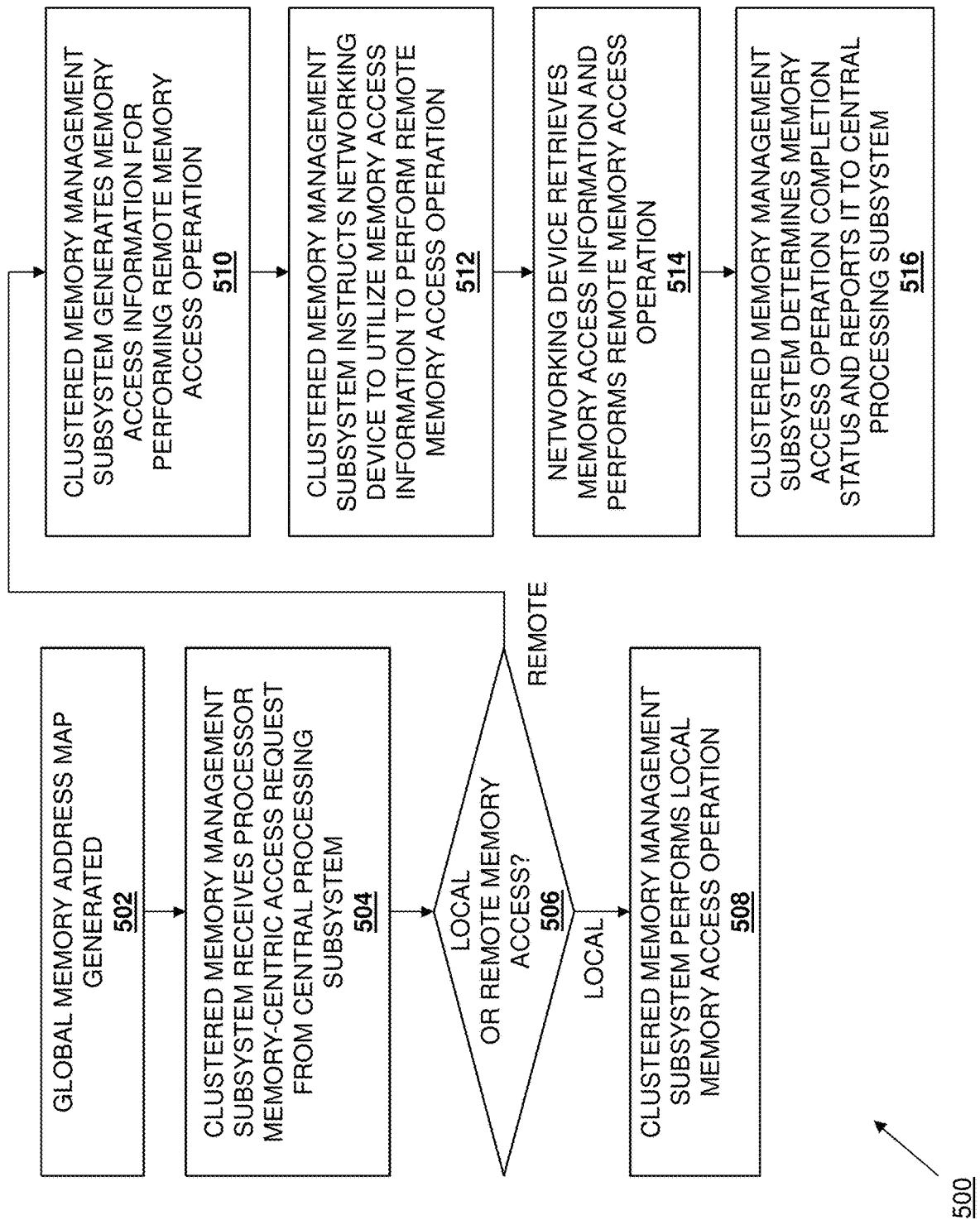
FIG. 5 is a flow chart illustrating an embodiment of a method for providing clustered memory.

Referring now to FIG. 5, an embodiment of a method 500 for providing clustered memory is illustrated. As discussed below, the systems and methods of the present disclosure provide a clustered memory management subsystem that provides a clustered memory hardware abstraction layer and utilizes hardware subsystems to identify processor memory-centric access requests that are directed to remote memory subsystems, and generate remote memory access information for use by a networking device to perform remote memory access operations. For example, the clustered memory system of the present disclosure may include a first computing system that is coupled to a second computing system via a network, and that includes a clustered memory management subsystem coupled to a central processing subsystem and a networking device. The clustered memory management subsystem receives a processor memory-centric access request associated with a memory access operation from the central processing subsystem, and uses memory management hardware to determine that the processor memory-centric access request is directed to a second memory subsystem in the second computing system. The clustered memory management subsystem then uses remote memory access hardware to generate memory access information for performing the memory access operation at the second memory subsystem, and instructs the networking device to utilize the memory access information to transmit at least one memory access communication that performs the memory access operation at the second memory subsystem. Thus, a global memory address space may be presented to the operating system and/or other applications in a computing system, while allowing memory access operations requested for those applications by a central processing subsystem via processor memory-centric access requests to be converted to remote memory access operations via high-speed, dedicated hardware and without the use of remote memory access software (e.g., middleware/libraries/sockets) executed by that central processing subsystem.

In some embodiments, during or prior to the method 500, the SCP subsystems 304 in each computing system 202a-202c/300 may establish secure communication channels with each other. For example, each of the SCP subsystems 304 in the computing systems 202a-202c/300 may be configured to perform the secure communication functionality described by the inventors of the present disclosure in U.S. patent application Ser. No. 17/079,737, filed on Oct. 26, 2020, the disclosure of which is incorporated herein by reference in its entirety. Thus, as described in that application, the SCP subsystem 304 in the computing system 202b/300 may identify the SCP subsystem 304 in the computing system 202a/300, sign a second SCP authentication communication with a second private key, and transmit the second signed SCP authentication communication to the SCP subsystem 304 in the computing system 202a/300, while the SCP subsystem 304 in the computing system 202a/300 signs a first SCP authentication communication with a first private key, and transmits the first signed SCP authentication communication to the SCP subsystem 304 in the computing system 202b/300. The SCP subsystem 304 in the computing system 202b/300 may then authenticate the first SCP authentication communication using a first public key, the SCP subsystem 304 in the computing system 202a/300 may authenticate the second SCP authentication communication using a second public key and, in response, the SCP subsystems 304 in the computing systems 202a/300 and 202b/300 will establish a secure communication channel.

As also described in that application, the SCP subsystem 304 in the computing system 202b/300 may then identify the SCP subsystem 304 in the computing system 202c/300, sign a second SCP authentication communication with a second private key, and transmit the second signed SCP authentication communication to the SCP subsystem 304 in the computing system 202c/300, while the SCP subsystem 304 in the computing system 202c/300 signs a third SCP authentication communication with a third private key, and transmits the third signed SCP authentication communication to the SCP subsystem 304 in the computing system 202b/300. The SCP subsystem 304 in the computing system 202b/300 may then authenticate the third SCP authentication communication using a third public key, the SCP subsystem 304 in the computing system 202c/300 may authenticate the second SCP authentication communication using a second public key and, in response, the SCP subsystems 304 in the computing systems 202b/300 and 202c/300 will establish a secure communication channel.

As also described in that application, the SCP subsystem 304 in the computing system 202b/300 may then attest to the authentication of the SCP subsystem 304 in the computing system 202c/300 to the SCP subsystem 304 in the computing system 202a/300, and attest to the authentication of the SCP subsystem 304 in the computing system 202a/300 to the SCP subsystem 304 in the computing system 202c/300, which allows the SCP subsystems 304 in the computing systems 202a/300 and 202c/300 to establish a secure communication channel without transmitting signed SCP authentication communications. Furthermore, any SCP subsystem authenticated by an SCP subsystem may have its authentication attested to other SCP subsystems to quickly and securely grow the secure communication fabric between the SCP subsystems. As also described in that application, enabling keys may provide for use of the secure communication channels by each of the SCP subsystems 304 in the computing systems 202a/300, 202b/300, and 202c/300 to securely exchange communications, and continued performance of the platform root-of-trust functionality referenced above by those SCP subsystems will ensure that the secure communication channels are only maintained with trusted SCP subsystems and/or computing systems. As such, secure communication channels may be established between the SCP subsystems 304 in the computing systems 202a-202c/300 that each operate as trusted systems to perform any of the inter-SCP subsystem communications discussed below in a secure manner.

The method 500 begins at block 502 where a global memory address map is generated. In an embodiment, at block 502, the SCP subsystems 304/400 in the computing systems 202a-202c/300 may power on, reset, reboot, and/or otherwise initialize and, in response, the clustered memory management engine 404 in each of those SCP subsystems 304/400 may retrieve its "local" memory subsystem information, clustered memory map information, and/or other clustered memory information known in the art, and broadcast that clustered memory information to the other SCP subsystems 304/400. As such, at block 502, the clustered memory management engine 404 in each of the SCP subsystems 304/400 in the computing systems 202a-202c/300 may retrieve the clustered memory information broadcast by each of the other SCP subsystems 304/400, which allows the clustered memory management engine 404 in each of the SCP subsystems 304/400 to generate a global memory address map, configure memory subsystem offsets, configure Base Address Register (BAR) windowing registers, and/or perform any other global memory information that one of skill in the art in possession of the present disclosure will appreciate would provide for the clustered memory functionality discussed below. As will be appreciated by one of skill in the art in possession of the present disclosure, while not explicitly described above, the global memory address map generation may involve the management system 206 (e.g., an SCP manager) while remaining within the scope of the present disclosure as well.

Figure 6:
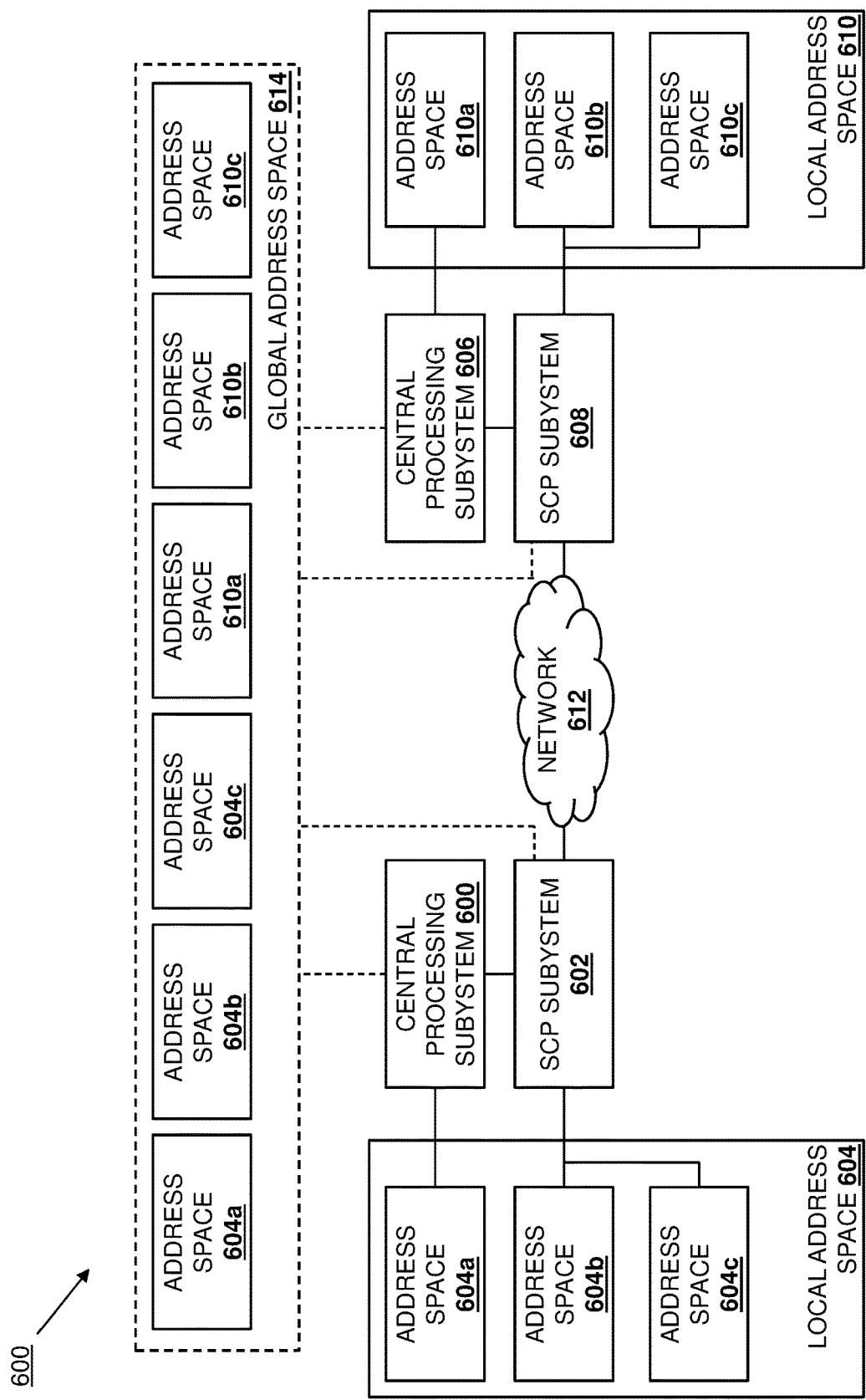
FIG. 6 is a schematic view illustrating an embodiment of a global clustered memory space.

With reference to FIG. 6, an embodiment of a global memory address map 600 is illustrated that may be generated by a simplified clustered memory system provided according to the teachings of the present disclosure. In the illustrated example, global memory address map 600 is provided for two computing systems, with a first computing system (e.g., the computing system 202a in the examples below) including the central processing subsystem 600 and the SCP subsystem 602 coupled together and associated with a local address space 604 that is provided by an address space 604a that is directly connected to the central processing subsystem 600 (e.g., an address space provided by the memory subsystems 310a-310c in the computing system 300 discussed above), and address spaces 604b and 604c that are directly connected to the SCP subsystem 602 (e.g., address spaces provided by the memory subsystems 416 in the SCP system 400 discussed above), and a second computing system (e.g., the computing system 202b in the examples below) including the central processing subsystem 606 and the SCP subsystem 608 coupled together and associated with a local address space 610 that is provided by an address space 610a that is directly connected to the central processing subsystem 606 (e.g., an address space provided by the memory subsystems 310a-310c in the computing system 300 discussed above), and address spaces 610b and 610c that are directly connected to the SCP subsystem 608 (e.g., address spaces provided by the memory subsystems 416 in the SCP system 400 discussed above). Furthermore, a network 612 (e.g., the network 204 discussed above with reference to FIG. 2) couples together the first computing system and the second computing system via their respective SCP subsystems 602 and 608.

As such, FIG. 6 illustrates how both the central processing subsystem 600 and SCP subsystem 602 in the first computing system, and both the central processing subsystem 606 and SCP subsystem 608 in the second computing system, are associated with a global address space 614 that includes the address space 604a that is directly connected to the central processing subsystem 600, the address spaces 604b and 604c that are directly connected to the SCP subsystem 602, the address space 610a that is directly connected to the central processing subsystem 606, and the address spaces 610b and 610c that are directly connected to the SCP subsystem 608. One of skill in the art in possession of the present disclosure will appreciate how the central processing subsystem 600 and SCP subsystem 602 in the first computing system may view the address spaces 604a-604c as "local" address space (i.e., local to their first computing system) and the address spaces 610a-610c as "remote" address space (i.e., remote from their first computing system), while the central processing subsystem 606 and SCP subsystem 608 in the second computing system may view the address spaces 604a-604c as "remote" address space (i.e., remote from their second computing system) and the address spaces 610a-610c as "local" address space (i.e., local to their second computing system).

Furthermore, while not described in detail herein, one of skill in the art in possession of the present disclosure will appreciate how memory subsystems offsets may be configured for the memory subsystem(s) in the first computing system and the second computing system in order to address the use of different/inconsistent addressing information for the memory subsystems in the first and second computing systems (e.g., a remote memory address in a memory subsystem included in the second computing system may be defined as "address 1000" in the first computing system while being defined as "address 2000" in the second computing system, with the memory subsystem offsets utilized to convert a memory access request for "address 1000" by the central processing subsystem 600 in the first computing system to a memory access request for "address 2000" in the second computing system).

Furthermore, while not described in detail herein, one of skill in the art in possession of the present disclosure will also appreciate how BAR windowing registers in the central processing subsystem coupling 408 may be configured at block 502 as well. As will be recognized by one of skill in the art in possession of the present disclosure, a BAR may provide the beginning of the address space assigned to a "local" SCP subsystem by its corresponding "local" central processing subsystem (e.g., an x86 host CPU), and all of the memory subsystem for local SCP subsystem, as well as remote memory subsystems, may be accessed by that central processing subsystem generating an access identified by "BAR+an offset" that identifies where the access (e.g., a read or write) is targeted. As such, configuration operations may be performed at block 502 to provide BAR windowing register functionality discussed above, as well as any other BAR windowing functionality known in the art, while remaining within the scope of the present disclosure. However, while a specific, simplified global memory address map is illustrated and described, one of skill in the art in possession of the present disclosure will appreciate that global memory address maps utilized with the clustered memory system of the present disclosure may be more complicated and/or may include different features than described above while remaining within the scope of the present disclosure as well.

Figure 7A:
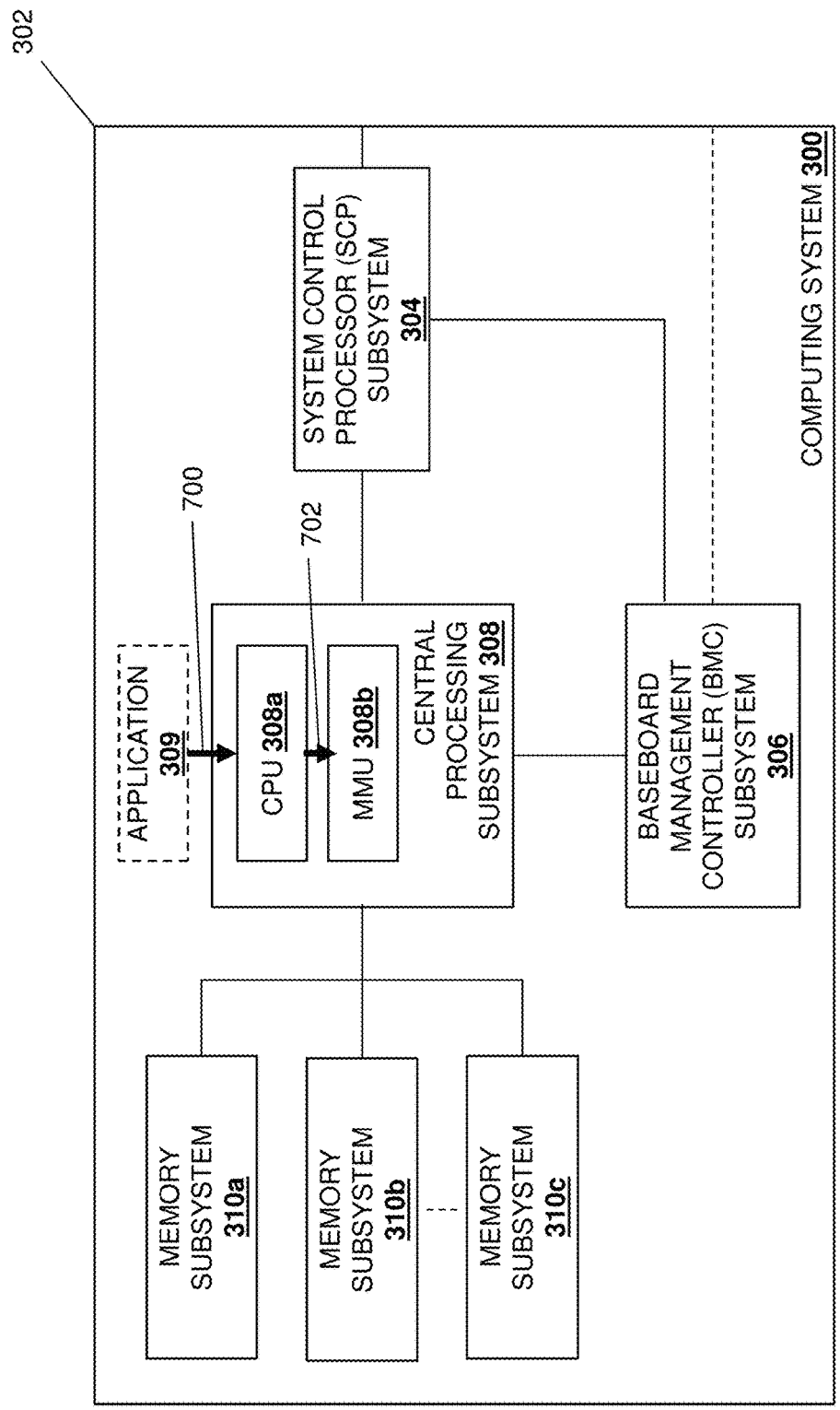
FIG. 7A is a schematic view illustrating an embodiment of the computing system of FIG. 3 operating during the method of FIG. 5.

The method 500 then proceeds to block 504 where a clustered memory management subsystem receives a processor memory-centric access request from a central processing subsystem. As illustrated in FIG. 7A, in some embodiments, the application 309 provided in the computing system 202a/300 may perform application memory access request operations 700 that may include generating and transmitting an application request to perform a memory access to the CPU 308a in the computing system 202a/300, with that application request identifying a memory read operation, a memory write operation, and/or other memory access operations known in the art, along with any other memory access operation information (e.g., data to write as part of the memory write operation, etc.) that would be apparent to one of skill in the art in possession of the present disclosure. As will be appreciated by one of skill in the art in possession of the present disclosure, the SCP subsystem 304/400 in the computing system 202a/300 may present the global memory address space to the applications 309 (e.g., an operating system and/or other applications) in the computing system 202a/300, which allows the application 309 to identify a memory address from that global memory address space in its application request to perform a memory access.

In response to receiving the application request to perform the memory access from the application 309, the CPU 308a in the computing system 202a/300 may perform CPU memory access request operations 702 that include generating and transmitting a CPU request to perform a memory access to the MMU 308b in the computing system 202a/300. In several embodiments, the CPU request to perform the memory access is a processor memory-centric access request that is generated by the CPU 308a and that includes a memory subsystem address pointer (e.g., *ptr) that points to a memory address (e.g., from the global memory address space) at which the memory access operation requested by the application (e.g., the memory read operation, memory write operation, and/or other memory access operations) should be performed, and that may include any other memory access operation information (e.g., data to write as part of the memory write operation, etc.) that would be apparent to one of skill in the art in possession of the present disclosure.

As such, one of skill in the art in possession of the present disclosure will appreciate that the processor memory-centric access requests described herein utilize the native protocol of the central processing subsystem (e.g., a CPU) to perform CPU load operations, and CPU store operations. For example, one of skill in the art in possession of the present disclosure will recognize that the generation of an Ethernet packet may require a CPU to perform thousands of load/store operations in order to program an Ethernet controller and create an Ethernet descriptor that allows the Ethernet controller to send and/or receive data packet. Furthermore, one of skill in the art in possession of the present disclosure will also recognize that CPUs utilize processor memory-centric access requests (e.g., native load/store instructions) to communicate with Dynamic Random Access Memory (DRAM), and load/store operations an conventionally mapped to native CPU instructions, while Ethernet send/receive operations are not conventionally mapped to native CPU instructions. However, while a specific CPU-memory-access request is described, one of skill in the art in possession of the present disclosure will appreciate that the CPU 308a may utilize other memory pointer access techniques/native memory semantics to provide the CPU request to perform the memory access while remaining within the scope of the present disclosure as well.

As will be appreciated by one of skill in the art in possession of the present disclosure, in response to receiving the CPU request to perform the memory access from the CPU 308a, the MMU 308b in the computing system 202a/300 may reference a global memory address map (e.g., the global memory address map 600 discussed above) to determine whether that the CPU request to perform the memory access is directed to a computing system "local" memory subsystem (e.g., using the example of the global memory address map 600 above, the processor memory-centric access request points to a memory address included in the address space 604a provided by any of the memory subsystems 310a-310c in the computing system 202a/300), or a computing system "remote" memory subsystem (e.g., using the example of the global memory address map 600 above, the processor memory-centric access request points to a memory address included in the address spaces 604b or 604c provided by any of the memory subsystems 416 included in the SCP subsystem 304 in the computing system 202a/300, or to a memory address included in the address spaces 610a-610c provided by the memory subsystems included in other computing systems 202b or 202c).

Figure 7B:
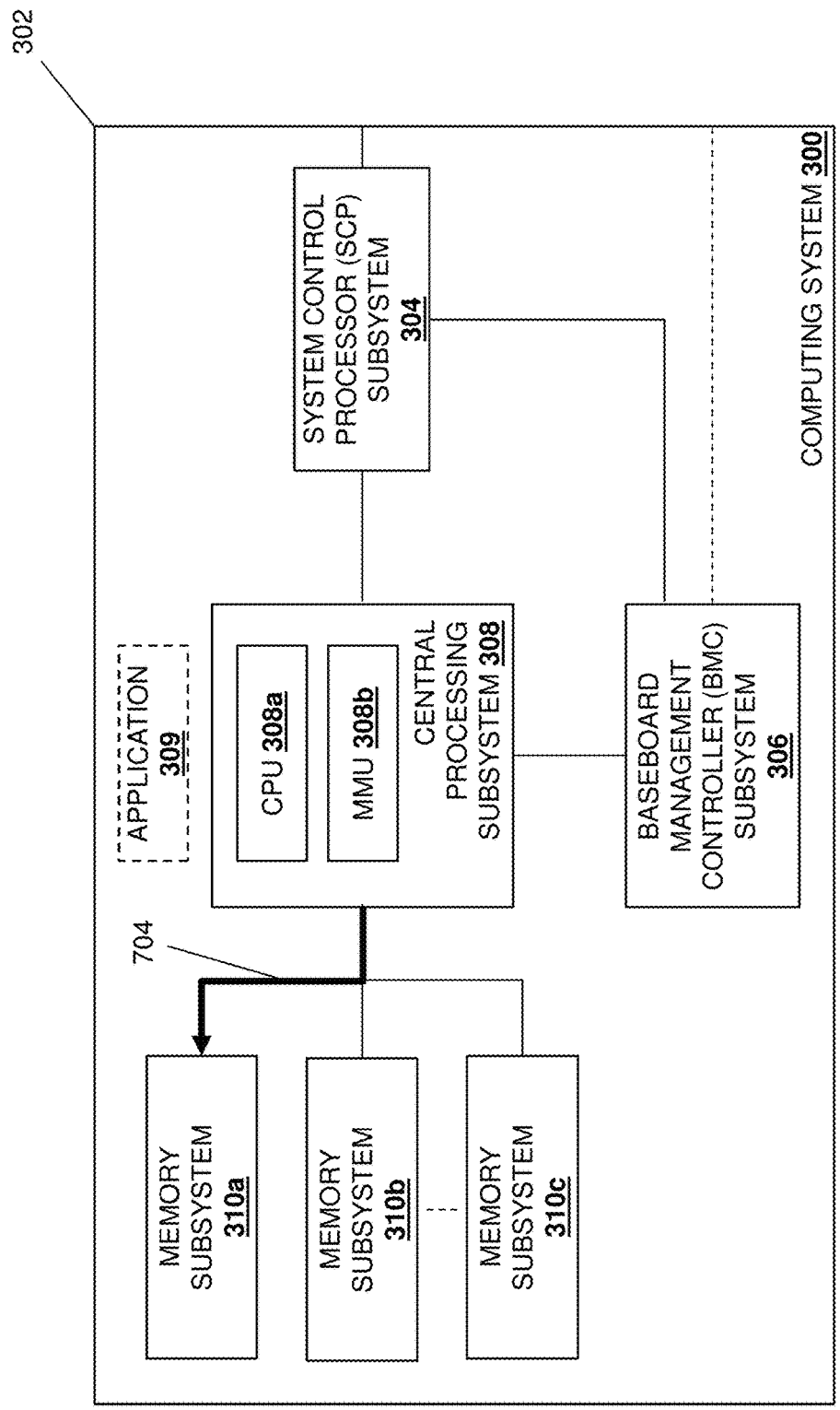
FIG. 7B is a schematic view illustrating an embodiment of the computing system of FIG. 3 operating during the method of FIG. 5.

With reference to FIG. 7B, in response to the MMU 308a in the computing system 202a/300 determining that the CPU request to perform the memory access is directed to a computing system "local" memory subsystem (e.g., the processor memory-centric access request points to a memory address included in the address space 604a provided by the memory subsystem 310a in the computing system 202a/300 in this example), the central processing subsystem 308 in the computing system 202a/300 may perform the memory access operation 704 specified in that CPU request on the memory subsystem 310a in the computing system 202a/300. As discussed above, in some examples the memory access operation 704 specified in the CPU request to perform the memory access may include a memory write operation, and the memory access operations 704 may include writing data included in that CPU request to the memory subsystem 310a. As also discussed above, in some examples the memory access operation 704 specified in the CPU request to perform the memory access may include a memory read operation, and the memory access operations 704 may include reading data from the memory subsystem 310a and returning it to the application 309. However, while two specific examples are provided, one of skill in the art in possession of the present disclosure will appreciate that the memory access operation 704 may include any of a variety of memory access operations while remaining within the scope of the present disclosure as well.

Figure 7C:
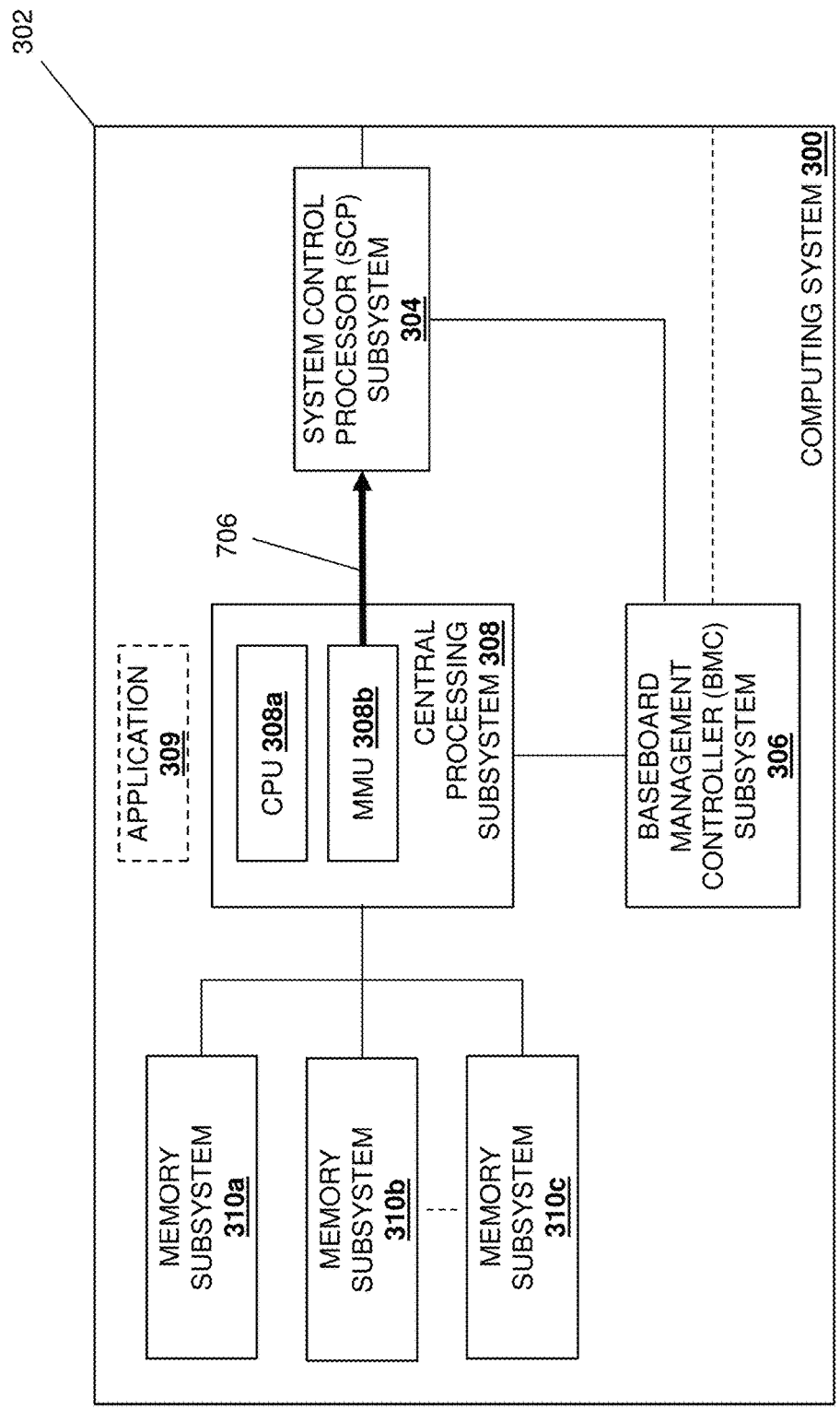
FIG. 7C is a schematic view illustrating an embodiment of the computing system of FIG. 3 operating during the method of FIG. 5.

With reference to FIG. 7C, in response to the MMU 308a in the computing system 202a/300 determining that the CPU request to perform the memory access is directed to a computing system "remote" memory subsystem (e.g., using the example of the global memory address map 600 above, the processor memory-centric access request points to a memory address included in the address spaces 604b or 604c provided by any of the memory subsystems 416 included in the SCP subsystem 304 or a memory address included in the address spaces 610a-610c provided by the memory subsystems included in the computing system 202a/300), the MMU 308b in the computing system 202a/300 may perform CPU memory request forwarding operations 706 to forward the CPU request to perform the memory access to the SCP subsystem 304 in the computing system 202a/300.

Figure 7D:
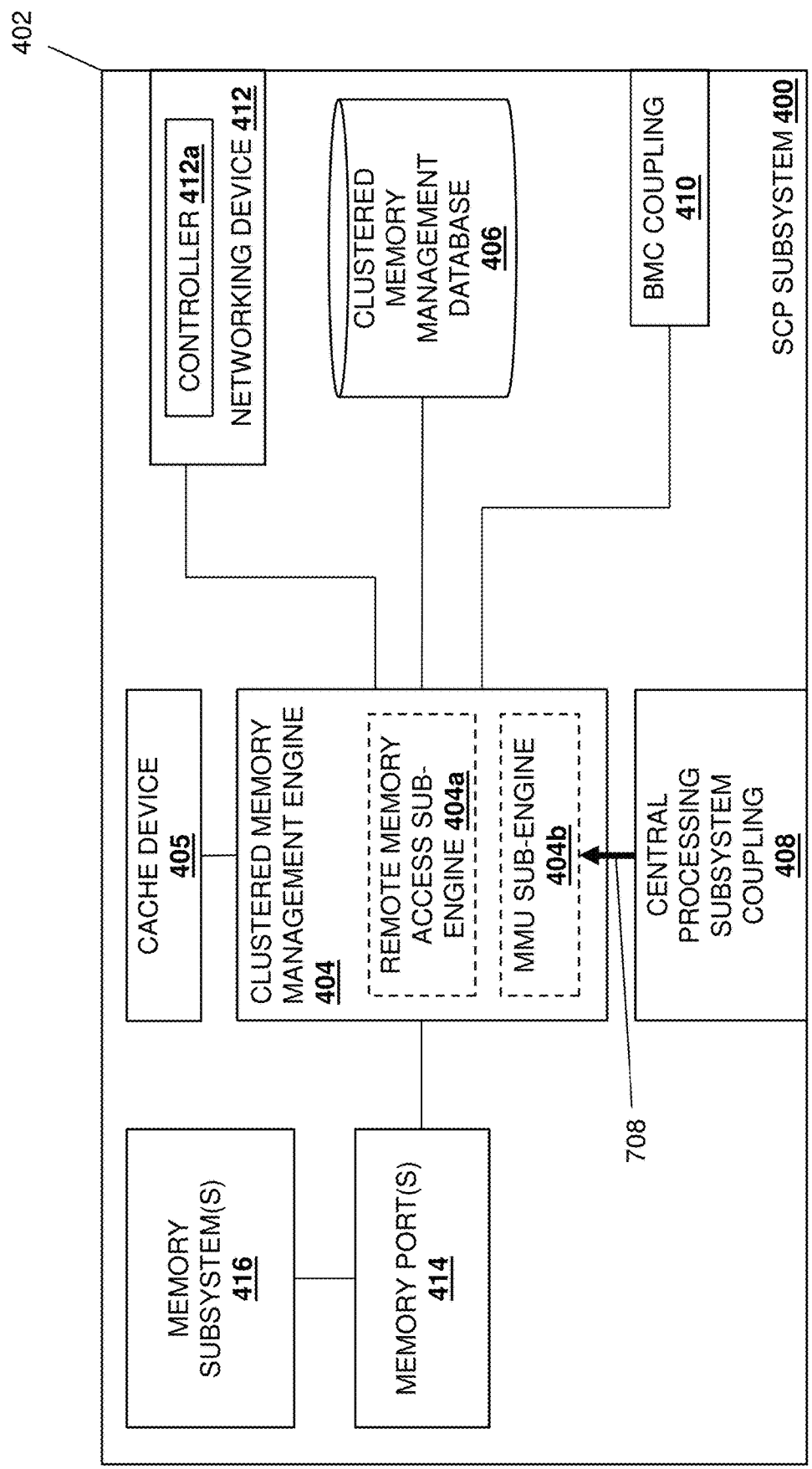
FIG. 7D is a schematic view illustrating an embodiment of the SCP subsystem of FIG. 4 operating during the method of FIG. 5.

As such, with reference to FIG. 7D and in an embodiment of block 504, the MMU sub-engine 404b in the clustered memory management engine 404 that is provided by the hardware subsystem and included in the SCP subsystem 304/400 in the computing system 202a/300 may perform memory access request receiving operations 708 that include receiving the CPU request to perform the memory access (e.g., the processor memory-centric access request) via the central processing subsystem coupling 408 and from the MMU 308a in the central processing subsystem 308 in the computing system 202a/300. In a specific example, the CPU request to perform the memory access (e.g., the processor memory-centric access request) may be transmitted by the MMU 308a in the central processing subsystem 308 in the computing system 202a/300 via a CxL port on that central processing subsystem 308, and received by the MMU sub-engine 404b in clustered memory management engine 404 of the SCP subsystem 304/400 in the computing system 202a/300 via CxL root.mem/.cache BAR windows provided by the central processing subsystem coupling 408 (e.g., in-bound memory windows associated with global memory address space). However, while specific subsystems for receiving the processor memory-centric access request at the clustered memory management subsystem are described, one of skill in the art in possession of the present disclosure will appreciate that other subsystems/techniques will fall within the scope of the present disclosure as well.

The method 500 then proceeds to decision block 506 where it is determined whether the processor memory-centric access request provides a local memory access or a remote memory access. In an embodiment, at decision block 506 in response to receiving the CPU request to perform the memory access from the CPU 308*a* (e.g., the processor memory-centric access request), the MMU sub-engine 404*b* in the clustered memory management engine 404 that is provided by the hardware subsystem and included in the SCP subsystem 304/400 in the computing system 202*a*/300 may reference a global memory address map (e.g., the global memory address map 600 discussed above) to determine whether that the CPU request to perform the memory access is directed to an SCP "local" memory subsystem (e.g., using the example of the global memory address map 600 above, the processor memory-centric access request points to a memory address included in the address spaces 604*b* or 604*c* provided by the memory subsystem(s) 416 in the SCP subsystem 304/400 in the computing system 202*a*/300), or an SCP "remote" memory subsystem (e.g., using the example of the global memory address map 600 above, the processor memory-centric access request points to a memory address included in the address spaces 610*a*-610*c* provided by the memory subsystems included in the computing systems 202*b* or 202*c*).

Figure 7E:
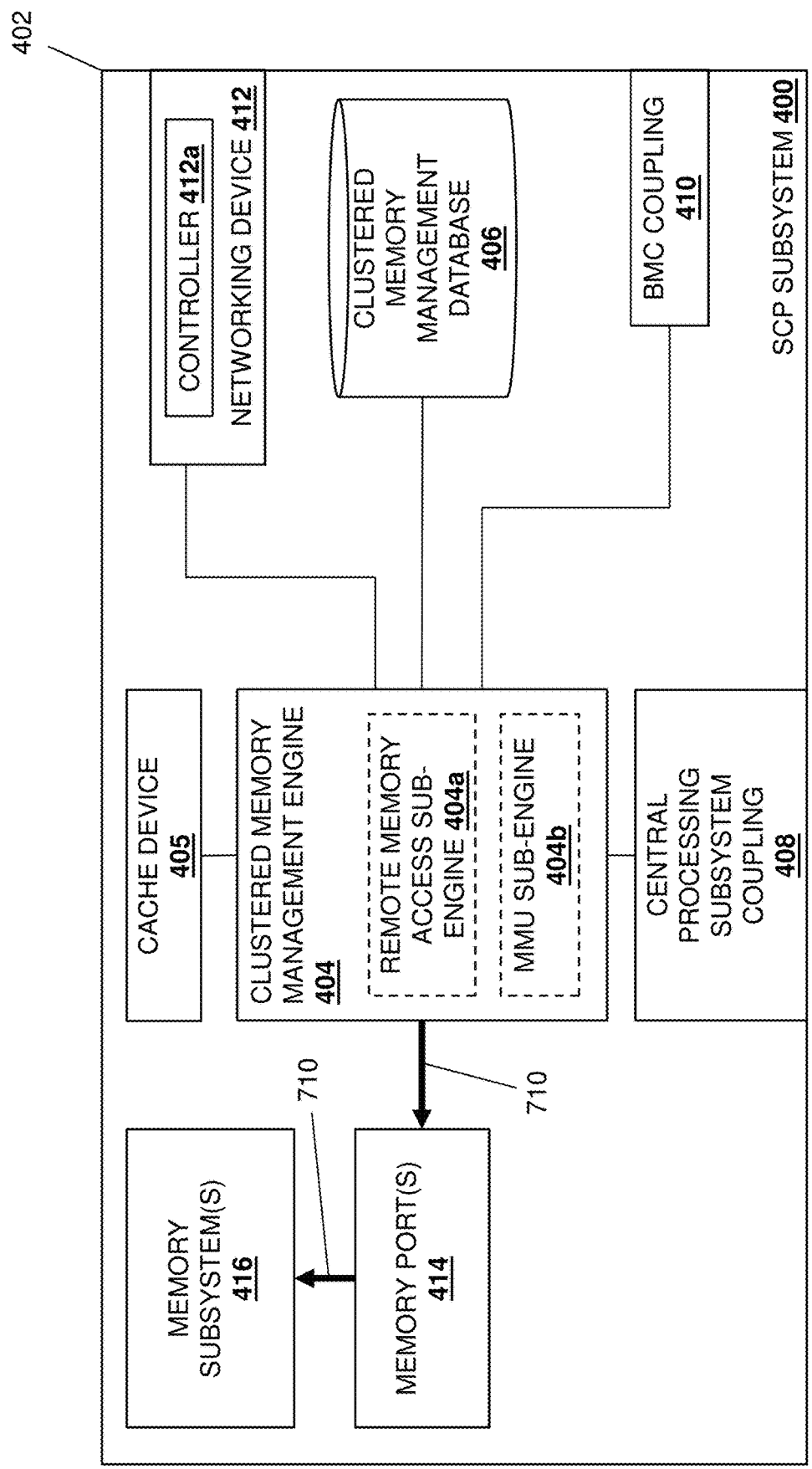
FIG. 7E is a schematic view illustrating an embodiment of the SCP subsystem of FIG. 4 operating during the method of FIG. 5.

If, at decision block 506, it is determined that the processor memory-centric access request provides a local memory access, the method 500 proceeds to block 508 where the clustered memory management subsystem performs local memory access operations. In an embodiment, at decision block 506 the MMU sub-engine 404*b* in the clustered memory management engine 404 that is provided by the hardware subsystem and included in the SCP subsystem 304/400 in the computing system 202*a*/300 may determine that the CPU request to perform the memory access is directed to an SCP "local" memory subsystem (e.g., the processor memory-centric access request points to a memory address included in the address spaces 604*c* or 604*c* provided by the memory subsystem(s) 416 in the SCP subsystem 304/400 in the computing system 202*a*/300). With reference to FIG. 7E, in response to determining that the CPU request to perform the memory access is directed to an SCP "local" memory subsystem, the clustered memory management engine 404 in the SCP subsystem 304/400 in the computing system 202*a*/300 may perform the memory access operation 710 specified in that CPU request via the memory port(s) 414 (e.g., CxL host ports) and on the memory subsystem(s) 416 in the SCP subsystem 304/400 in the computing system 202*a*/300.

As discussed above, in some examples the memory access operation 710 specified in the CPU request to perform the memory access may include a memory write operation, and the memory access operations 710 may include writing data included in that CPU request to the memory subsystem(s) 416. As also discussed above, in some examples the memory access operation 710 specified in the CPU request to perform the memory access may include a memory read operation, and the memory access operation 710 may include reading data from the memory subsystem(s) 416 and returning it to the application 309 (e.g., via the central processing subsystem coupling 408 in that SCP subsystem 304/400 and the central processing subsystem 308 in the computing system 202*a*/300). However, while two specific examples are provided, one of skill in the art in possession of the present disclosure will appreciate that the memory access operation 710 may include any of a variety of memory access operations while remaining within the scope of the present disclosure as well.

If, at decision block 506, it is determined that the processor memory-centric access request provides a remote memory access, the method 500 proceeds to block 510 where the clustered memory management subsystem generates memory access information for performing remote memory access operation. In an embodiment, at decision block 506 the MMU sub-engine 404*b* in the clustered memory management engine 404 that is provided by the hardware subsystem and included in the SCP subsystem 304/400 in the computing system 202*a*/300 may determine that the CPU request to perform the memory access is directed to an SCP "remote" memory subsystem (e.g., the processor memory-centric access request points to a memory address included in the address spaces 610*a*-610*c* provided by the memory subsystems included in the computing systems 202*b* or 202*c*).

However, in some examples and in response to determining that the CPU request to perform the memory access is directed to an SCP "remote" memory subsystem, the clustered memory management engine 404 in the SCP subsystem 304/400 in the computing system 202*a*/300 may determine whether data associated with the memory access operation identified in that CPU request (e.g., a memory read operation) in stored in the cache device 405 and, if so, may perform the memory access operation (e.g., reading the data) using the cache device 405 and without the need to proceed to block 510. As such, some remote memory access operations may be accomplished via the "local" cache device and, in the case of memory read operations, may include the clustered memory management engine 404 in the SCP subsystem 304/400 in the computing system 202*a*/300 determining whether the latest read data satisfying the remote memory access operations is located in the cache device 405 and, if so, transmitting that read data via the central processing subsystem coupling 408 in the SCP subsystem 304/400 in the computing system 202*a*/300 and to the application 309 via the central processing subsystem 308 in the computing system 202*a*/300. As such, one of skill in the art in possession of the present disclosure will appreciate how the SCP subsystem 304/400 in the computing system 202*a*/300 may operate to manage cache coherency in some embodiments, while in other embodiments cache coherency management may be performed using application-level software coherency mapping techniques that would be apparent to one of skill in the art in possession of the present disclosure.

Figure 7F:
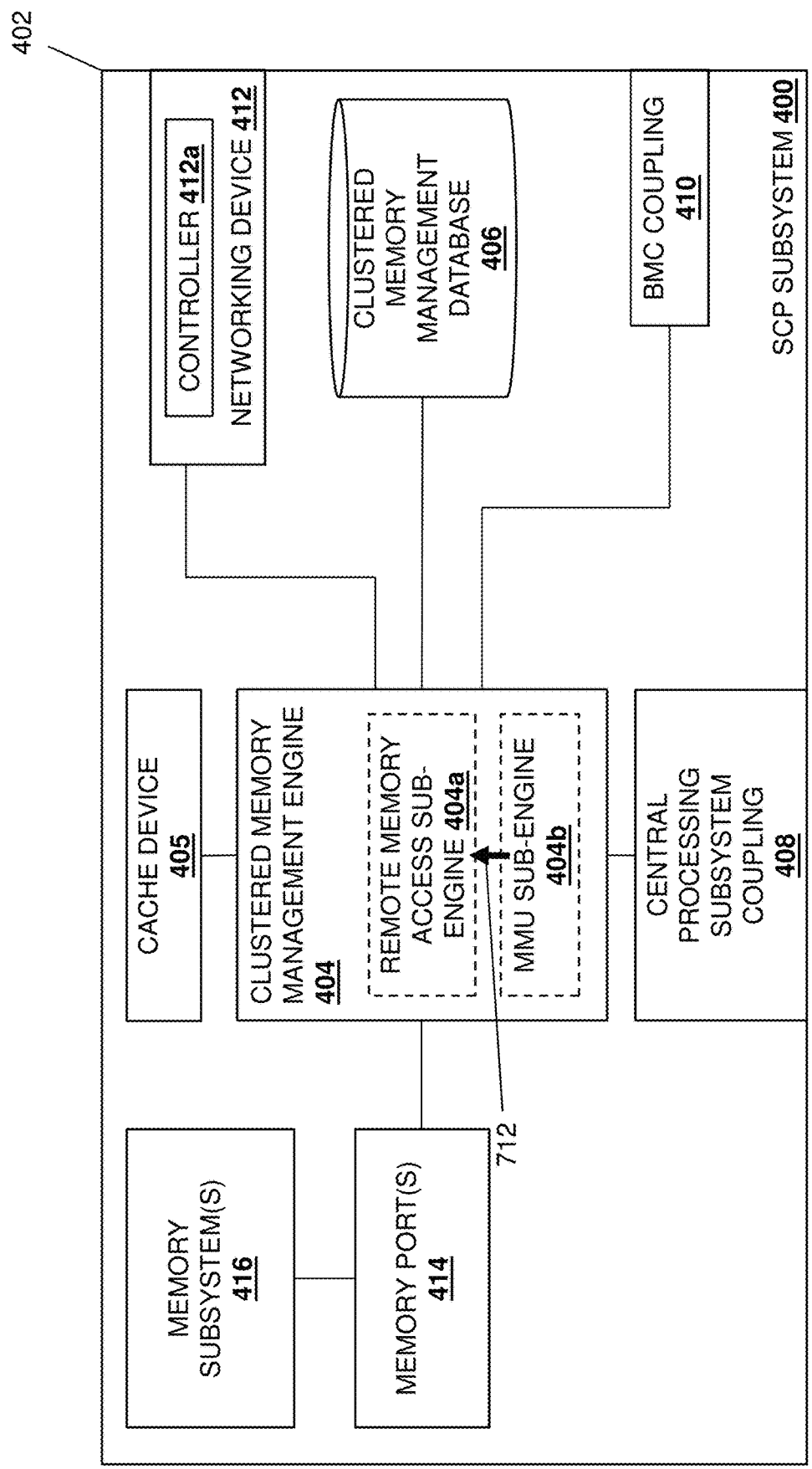
FIG. 7F is a schematic view illustrating an embodiment of the SCP subsystem of FIG. 4 operating during the method of FIG. 5.

With reference to FIG. 7F, in response to determining that the CPU request to perform the memory access is directed to an SCP "remote" memory subsystem, the MMU sub-engine 404*b* in the clustered memory management engine 404 that is provided by the hardware subsystem and included in the SCP subsystem 304/400 in the computing system 202*a*/300 may perform memory request transmission operations 712 to transmit the CPU request to perform the memory access (e.g., the processor memory-centric access request) to the remote memory access sub-engine 404*a* in the clustered memory management engine 404 that is provided by the hardware subsystem (e.g., a high speed state machine) included in the SCP subsystem 304/400 in the computing system 202*a*/300.

Figure 7G:
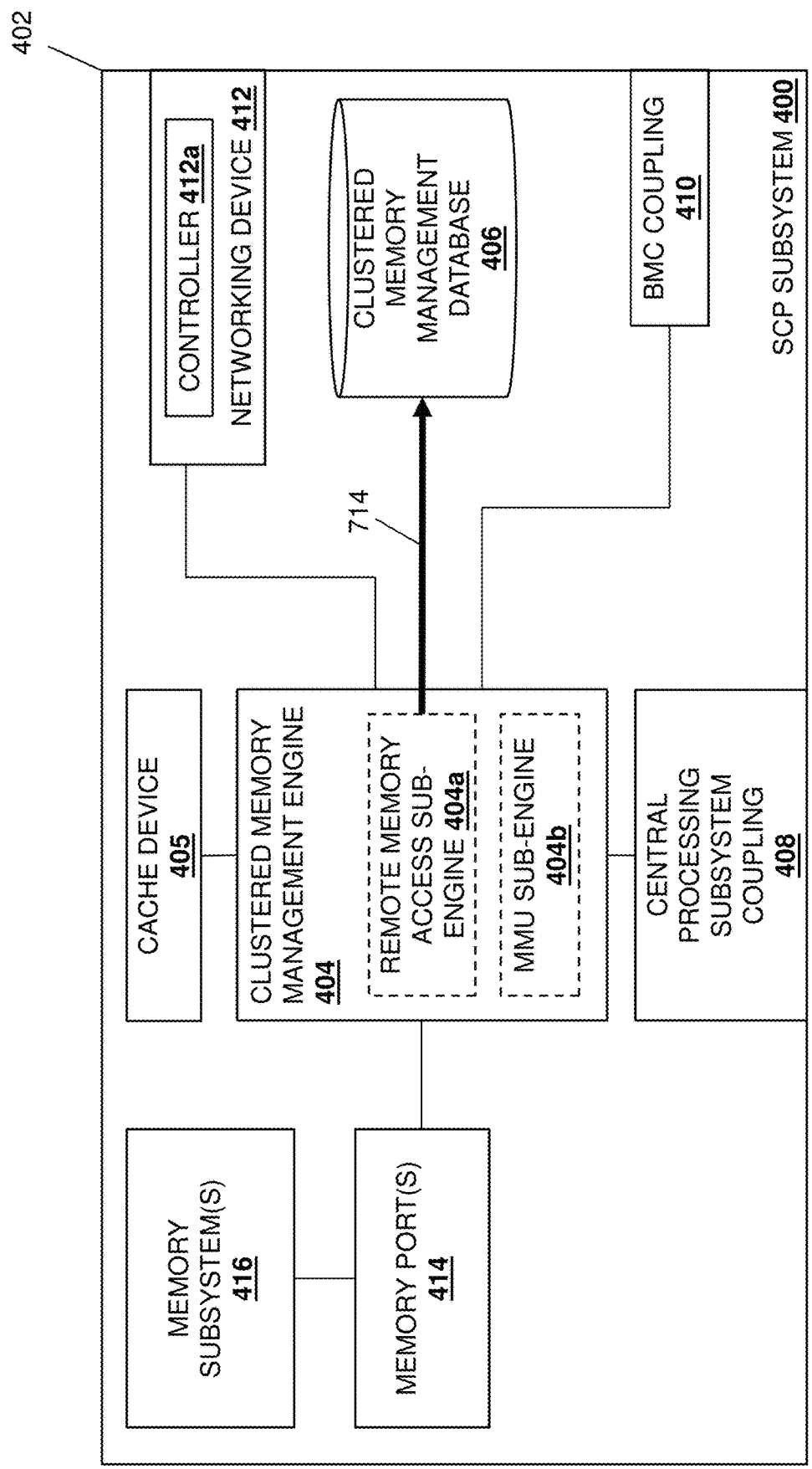
FIG. 7G is a schematic view illustrating an embodiment of the SCP subsystem of FIG. 4 operating during the method of FIG. 5.

With reference to FIG. 7G, in response to receiving the CPU request to perform the memory access (e.g., the processor memory-centric access request), the remote memory access sub-engine 404a in the clustered memory management engine 404 that is provided by the hardware subsystem and included in the SCP subsystem 304/400 in the computing system 202a/300 may perform remote memory access generation operations 714 to generate memory access information for performing remote memory access operation, and store that memory access information in the clustered memory management database 406 (e.g., provided by SRAM device(s)). For example, the remote memory access generation operations 704 may include the use of any information included in the CPU request to perform the memory access (e.g., the processor memory-centric access request) in order to generate an Ethernet descriptor for the controller 412a (e.g., an Ethernet controller) in the networking device 412 that identifies memory address information, memory access operations, and/or any other remote memory access information that one of skill in the art in possession of the present disclosure would recognize as allowing for the remote memory access operations discussed below.

In a specific example, the remote memory access generation operations 704 may include the utilization of the global memory address map and the CPU request in order to generate RDMA descriptors and/or any of a variety of RDMA information and/or instructions that allow for RDMA communications that enable the remote memory access operations discussed below. Furthermore, as discussed above, memory subsystems offsets may be utilized in the generation of the memory access information in order to address the use of different/inconsistent addressing information for the memory subsystems in the computing systems 202b or 202c by the computing system 202a. As will be appreciated by one of skill in the art in possession of the present disclosure, the generation of RDMA information for the performance of RDMA communications in the present disclosure may be performed by the remote memory access sub-engine 404a provided by the hardware subsystem, and without the conventional middleware, libraries, sockets, and/or other software required by the x86 host processor in conventional clustered memory systems. However, while RDMA communications provided according to the RDMA protocol are described, one of skill in the art in possession of the present disclosure will appreciate that the remote memory access operations discussed below may be enabled using Ethernet communications according to Ethernet protocols and/or other protocols while remaining within the scope of the present disclosure as well.

Figure 7H:
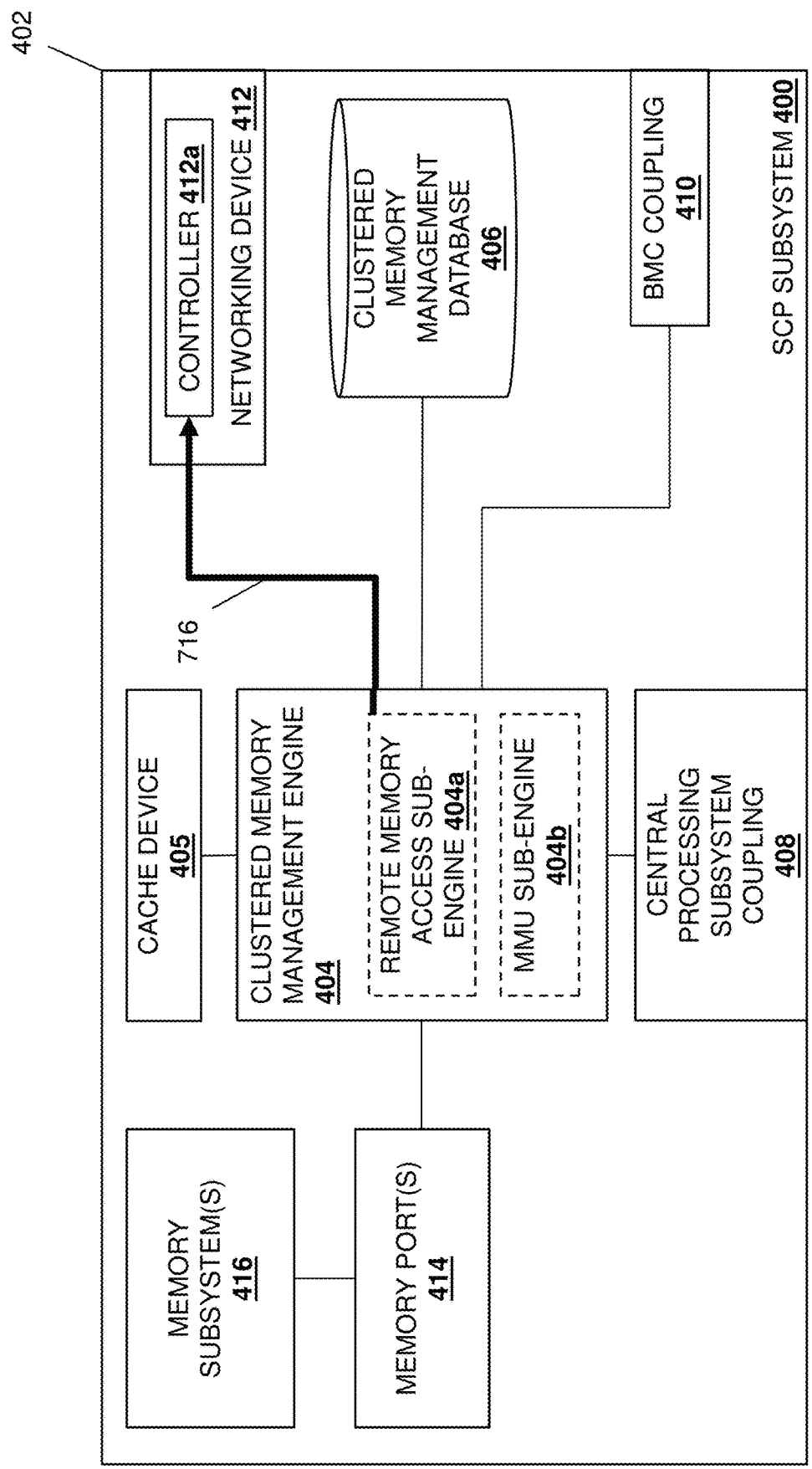
FIG. 7H is a schematic view illustrating an embodiment of the SCP subsystem of FIG. 4 operating during the method of FIG. 5.

The method 500 then proceeds to block 512 where the clustered memory management subsystem instructs a networking device to utilize the memory access information to perform the remote memory access operation. With reference to FIG. 7H, in an embodiment of block 512, the remote memory access sub-engine 404a in the clustered memory management engine 404 that is provided by the hardware subsystem and included in the SCP subsystem 304/400 in the computing system 202a/300 may perform memory access information utilization instruction operations 716 that include transmitting an instruction to the controller 412a in the networking device 412 to utilize the memory access information in the clustered memory management database 406 to perform a remote memory access operation.

Figure 7I:
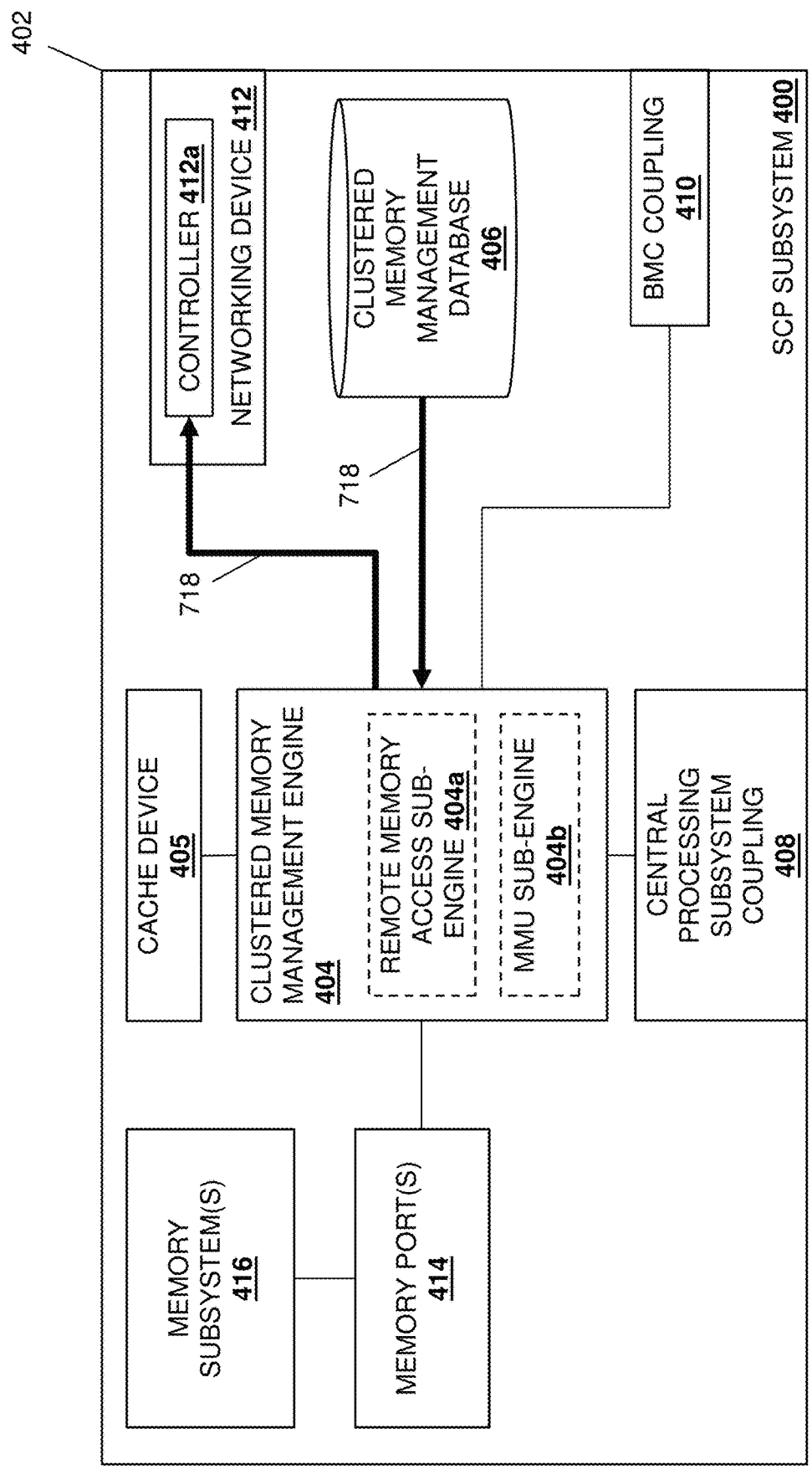
FIG. 7I is a schematic view illustrating an embodiment of the SCP subsystem of FIG. 4 operating during the method of FIG. 5.

The method 500 then proceeds to block 514 where the networking device retrieves the memory access information and performs the remote memory access operation. With reference to FIG. 7I, in an embodiment of block 514 and in response to receiving the instruction to utilize the memory access information in the clustered memory management database 406 to perform a remote memory access operation, the controller 412a (e.g., an Ethernet controller) in the networking device 412 in the SCP subsystem 304/400 in the computing system 202a/300 may perform remote memory access information access operations 718 to access the remote memory access information in the clustered memory management database 406 and use that remote memory access information to perform remote memory access operations. For example, at block 514, the controller 412a in the networking device 412 in the SCP subsystem 304/400 in the computing system 202a/300 may generate RDMA or Ethernet communications using the remote memory access information in SRAM provided by the clustered memory management database 406.

Figure 7K:
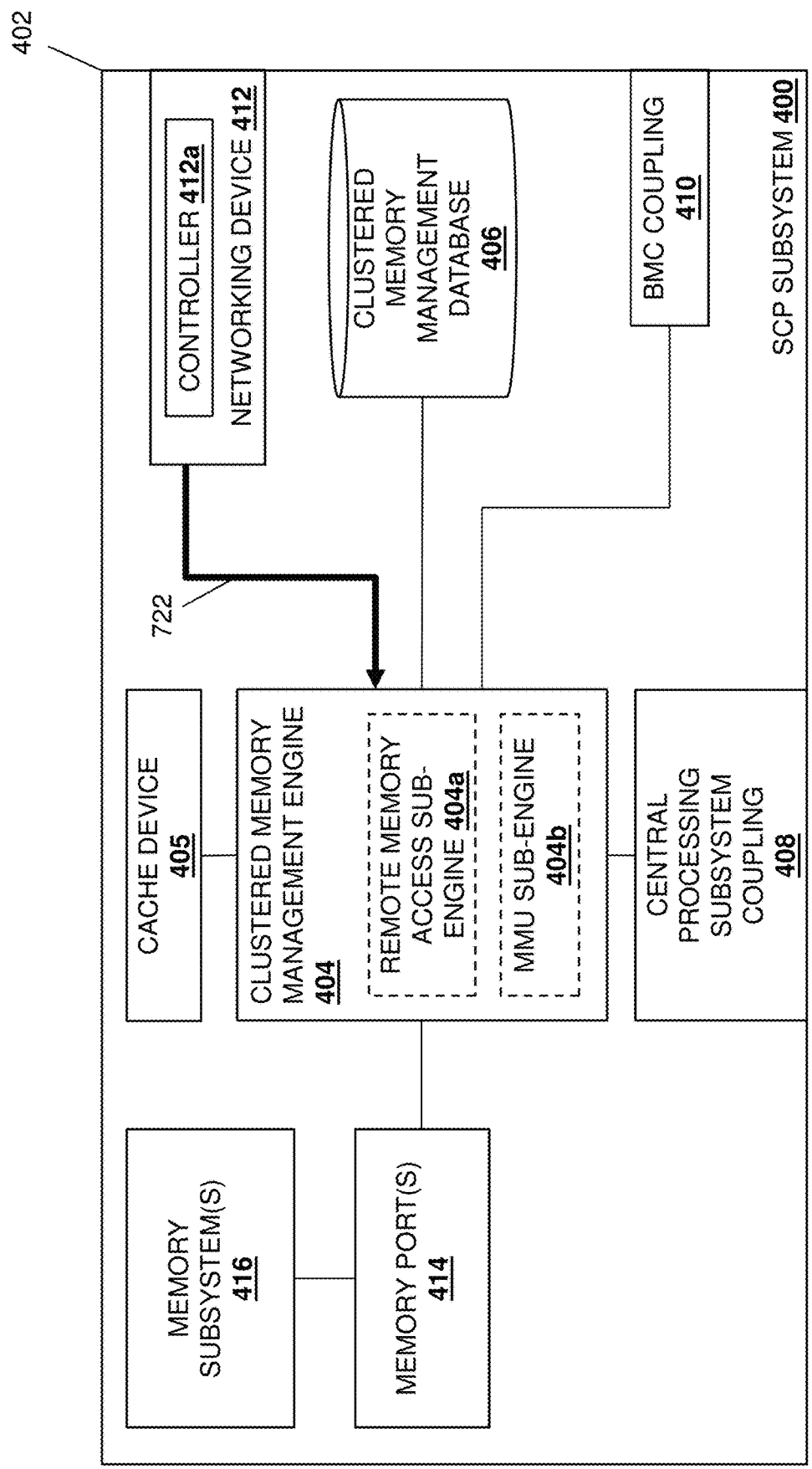
FIG. 7K is a schematic view illustrating an embodiment of the SCP subsystem of FIG. 4 operating during the method of FIG. 5.

With reference to FIG. 7J, the controller 412a in the networking device 412 in the SCP subsystem 304/400 in the computing system 202a/300 may perform remote memory access operations 720 that include transmitting remote memory access communications (e.g., the RDMA or Ethernet communications discussed above) via the network 204 to the computing system 202b/300. As illustrated in FIG. 7K, the networking device 412 in the SCP subsystem 304/400 in the computing system 202b/300 may receive those remote memory access communications via the network 204 and, in response, perform remote memory access communication transmission operations 722 that include transmitting the remote memory access communications to the clustered memory management engine 404 in the SCP subsystem 304/400 in the computing system 202b/300.

Figure 7L:
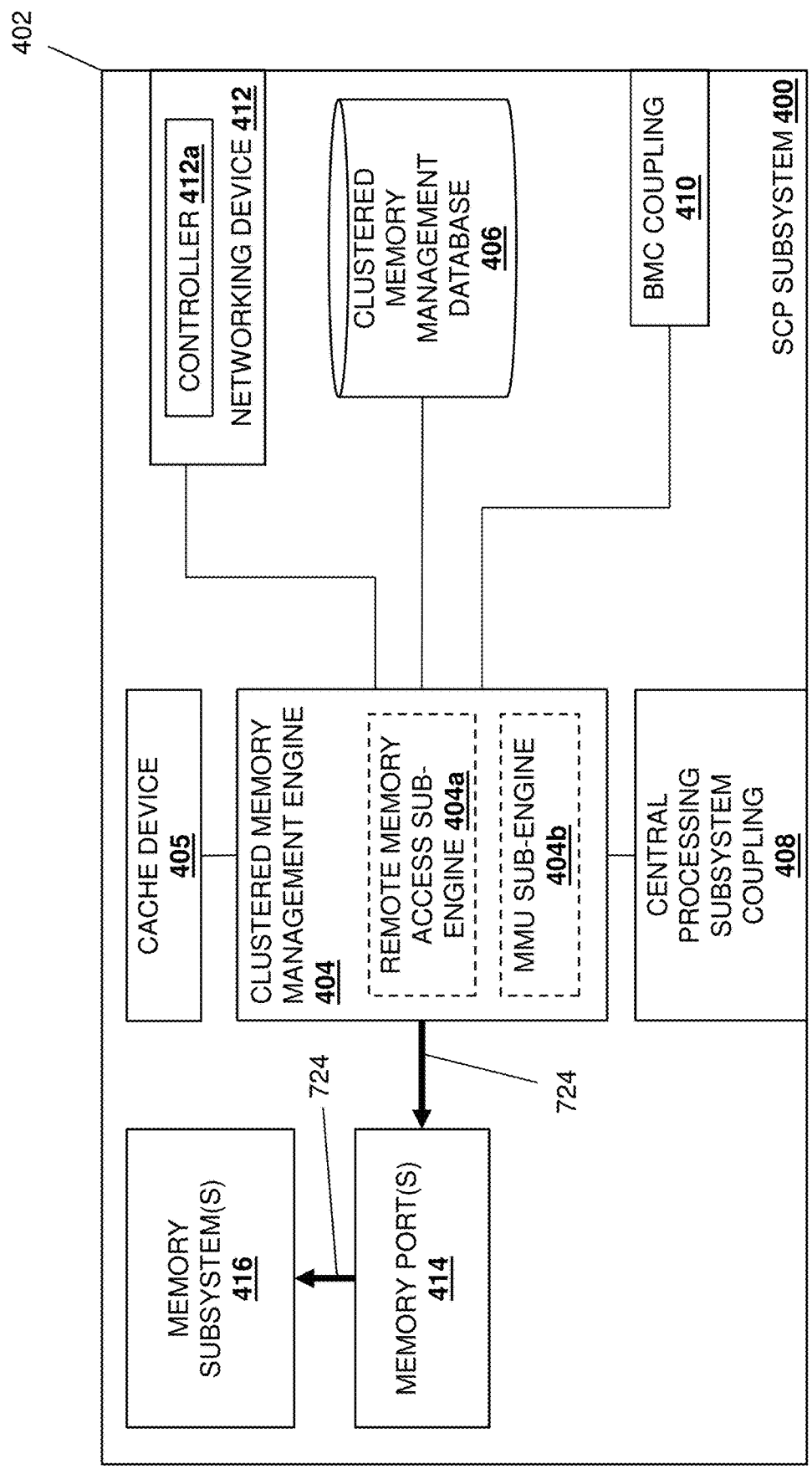
FIG. 7L is a schematic view illustrating an embodiment of the SCP subsystem of FIG. 4 operating during the method of FIG. 5.

The clustered memory management engine 404 in the SCP subsystem 304/400 in the computing system 202b/300 may receive the remote memory access communications and, in response, determine whether that remote memory access communication is directed to an SCP "local" memory subsystem (e.g., using the example of the global memory address map 600 discussed above, the remote memory access communication identifies a memory address included in the address spaces 604b or 604c provided by the memory subsystem(s) 416 in the SCP subsystem 304/400 in the computing system 202b/300), or a computing system "local" memory subsystem (e.g., using the example of the global memory address map 600 discussed above, the remote memory access communication identifies a memory address included in the address space 604a provided by the memory subsystems 310a-310c included in the computing system 202/300). As illustrated in FIG. 7L, if it is determined that the remote memory access communication is directed to an SCP "local" memory subsystem, the clustered memory management engine 404 in the SCP subsystem 304/400 in the computing system 202b/300 may perform memory access operations 724 specified in those remote memory access communications via the memory port(s) 414 (e.g., CxL host ports) and on the memory subsystem(s) 416 in the SCP subsystem 304/400 in the computing system 202b/300.

As discussed above, in some examples the memory access operation 724 specified in the remote memory access communication may include a memory write operation, and the memory access operations 724 may include writing data included in that remote memory access communication to the memory subsystem(s) 416 in the computing system 202b/300. As also discussed above, in some examples the memory access operation 724 specified in the remote memory access communication may include a memory read operation, and the memory access operation 724 may include reading data from the memory subsystem(s) 416 in the SCP subsystem 304/400 in the computing system 202b/300 and returning it to the application 309 in the computing system 202a/300 (e.g., via the networking device 412 in the SCP subsystem 304/400 in the computing system 202b/300 and though the network 204 to the SCP subsystem 304/400 in the computing system 202a/300, via the networking device 412, the clustered memory management engine 404, and the central processing subsystem coupling 408 in the SCP subsystem 304/400 in the computing system 202a/300, and via the central processing subsystem 308 in the computing system 202a/300). However, while two specific examples are provided, one of skill in the art in possession of the present disclosure will appreciate that the memory access operation 724 may include any of a variety of memory access operations while remaining within the scope of the present disclosure as well.

Figure 7M:
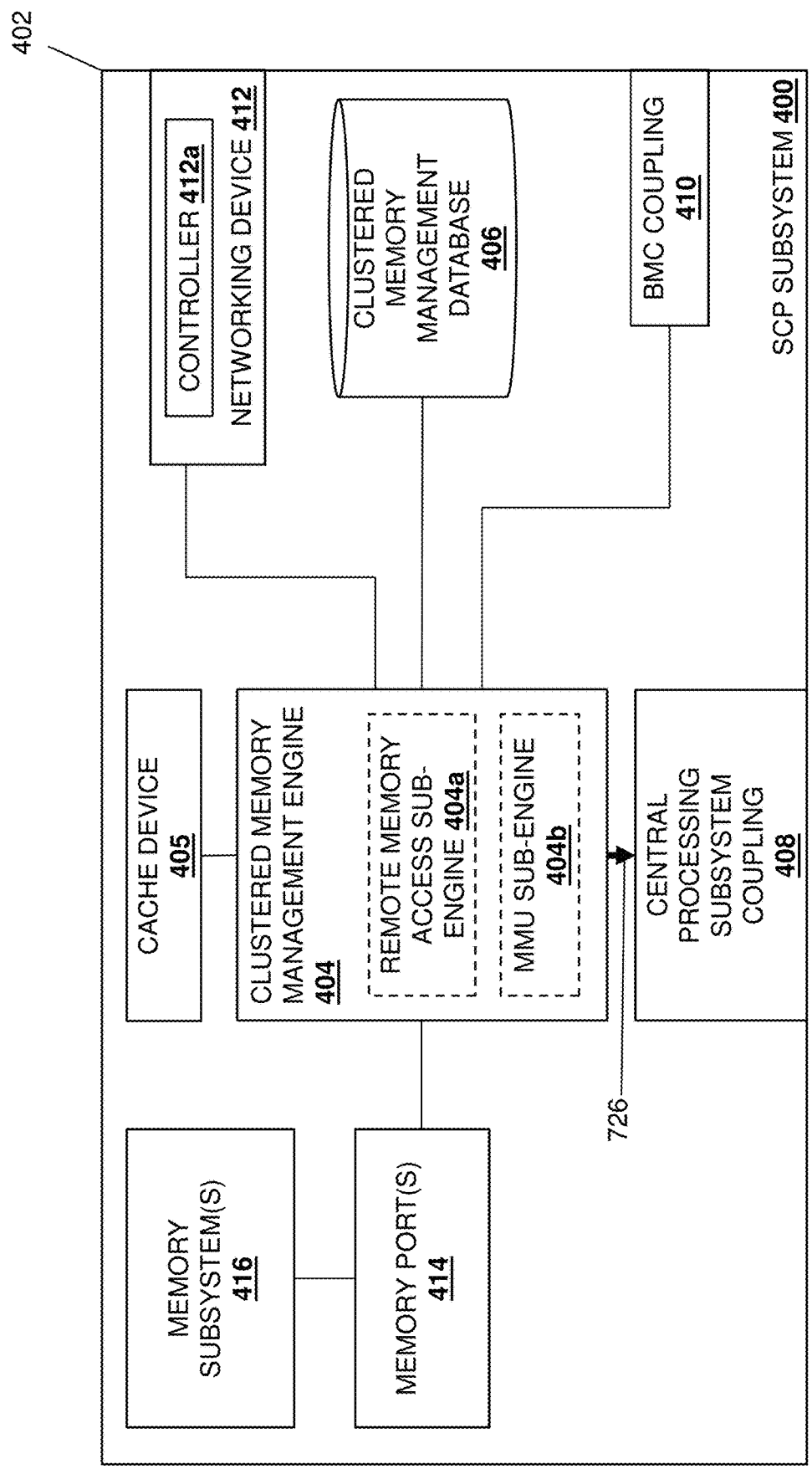
FIG. 7M is a schematic view illustrating an embodiment of the SCP subsystem of FIG. 4 operating during the method of FIG. 5.
Figure 7N:
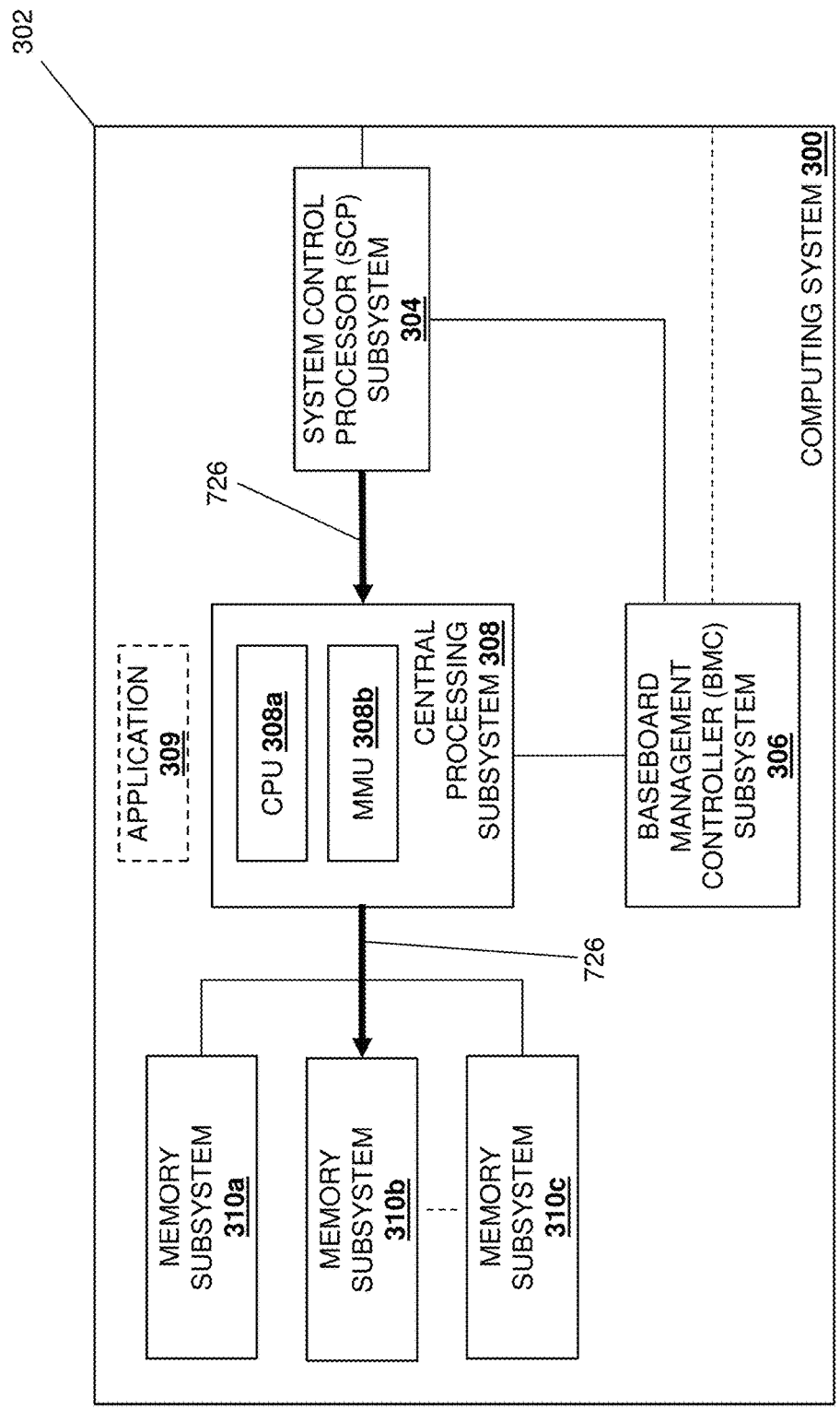
FIG. 7N is a schematic view illustrating an embodiment of the computing system of FIG. 3 operating during the method of FIG. 5.

As illustrated in FIGS. 7M and 7N, if it is determined that the remote memory access communication is directed to a computing system "local" memory subsystem, the clustered memory management engine 404 in the SCP subsystem 304/400 in the computing system 202b/300 may perform memory access operations 726 specified in those remote memory access communications via the central processing subsystem coupling 408 in the SCP subsystem 304/400 in the computing system 202b/300 and the central processing subsystem 308 in the computing system 202b/300, and on the memory subsystem 310b in the computing system 202b/300. As discussed above, in some examples the memory access operation 726 specified in the remote memory access communication may include a memory write operation, and the memory access operations 726 may include writing data included in that remote memory access communication to the memory subsystem 310b in the computing system 202b/300. As also discussed above, in some examples the memory access operation 726 specified in the remote memory access communication may include a memory read operation, and the memory access operation 726 may include reading data from the memory subsystem 310b in the computing system 202b/300 and returning it to the application 309 in the computing system 202a/300 (e.g., the SCP subsystem 304/400 in the computing system 202b/300 and though the network 204 to the SCP subsystem 304/400 in the computing system 202a/300, via the networking device 412, the clustered memory management engine 404, and the central processing subsystem coupling 408 in the SCP subsystem 304/400 in the computing system 202a/300, and via the central processing subsystem 308 in the computing system 202a/300). However, while two specific examples are provided, one of skill in the art in possession of the present disclosure will appreciate that the memory access operation 726 may include any of a variety of memory access operations while remaining within the scope of the present disclosure as well.

Figure 7O:
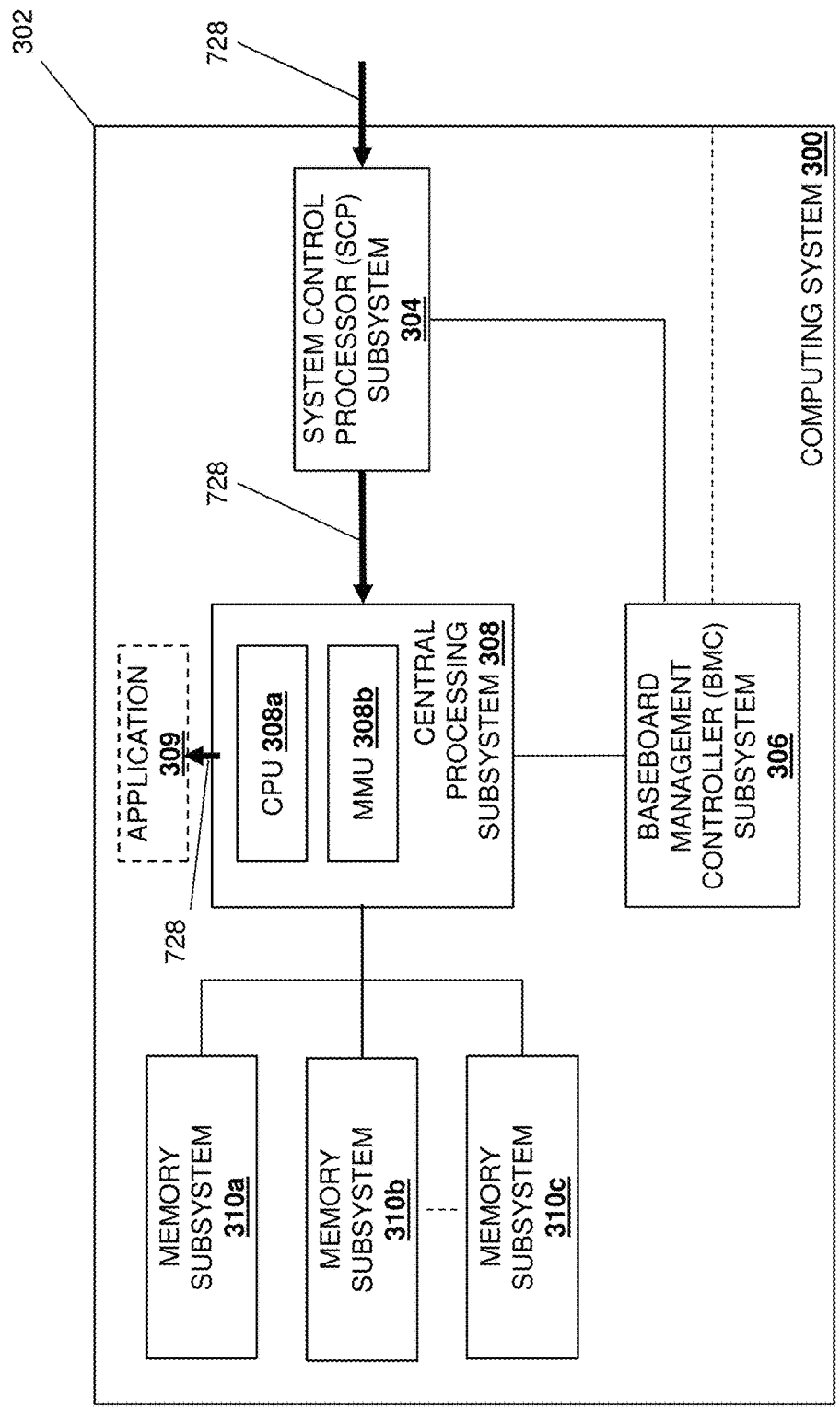
FIG. 7O is a schematic view illustrating an embodiment of the computing system of FIG. 3 operating during the method of FIG. 5.

The method 500 then proceeds to block 516 where the clustered memory management subsystem determines a memory access operation completion status and reports it to the central processing subsystem. In an embodiment, at block 516, the clustered memory management engine 404 in the SCP subsystem 304/400 in the computing system 202b/300 may report a completion status (e.g., a successful/completed status, an unsuccessful/incomplete status, etc.) of its memory access operation to the clustered memory management engine 404 in the SCP subsystem 304/400 in the computing system 202a/300, and the clustered memory management engine 404 in the SCP subsystem 304/400 in the computing system 202a/300 may report that completion status to the central processing subsystem 308 in the computing system 202a/300. For example, with reference to FIG. 7O, completion status reporting operations may include the SCP subsystem 304 in the computing system 202a/300 receive the completion status for the remote memory access operations from the SCP subsystem 304 in the computing system 202b/300 and transmitting that completion status to the central processing subsystem 308 in the computing system 202a/300, which may then transmit that completion status to the application 309 provided in the computing system 202a/300. As such, the application 308 may be informed of the completion status (e.g., a successful/completed status, an unsuccessful/incomplete status, etc.) of its memory access request.

Thus, systems and methods have been described that provide an SCP subsystem that utilizes hardware subsystems to identify processor memory-centric access requests that are directed to remote memory subsystems, and generate remote memory access information for use by a networking device to perform remote memory access operations. For example, the clustered memory system of the present disclosure may include a first server device that is coupled to a second server device via a network, and that includes a SCP subsystem coupled to a central processing subsystem and a networking device. The SCP subsystem receives a processor memory-centric access request associated with a memory access operation from the central processing subsystem, and uses memory management hardware to determine that the processor memory-centric access request is directed to a second memory subsystem in the second server device. The SCP subsystem then uses remote memory access hardware to generate memory access information for performing the memory access operation at the second memory subsystem, and instructs the networking device to utilize the memory access information to transmit at least one memory access communication that performs the memory access operation at the second memory subsystem. Thus, a global memory address space may be presented to the operating system and/or other applications in a server device, while allowing memory access operations requested for those applications by a central processing subsystem via processor memory-centric access requests to be converted to remote memory access operations via high speed, dedicated hardware and without the use of remote memory access software (e.g., middleware/libraries/sockets) executed by that central processing subsystem.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A clustered memory system, comprising:
  a second computing system that includes a second computing system chassis and that houses a second memory subsystem;
  a first computing system that includes a first computing system chassis that is separate from the second computing system chassis and that is coupled to the second computing system via a network;
  a central processing subsystem that is included in the first computing system chassis;
  a networking device that is included in the first computing system chassis; and
  a clustered memory management subsystem that is included in the first computing system chassis and coupled to the central processing subsystem and the networking device, wherein the clustered memory management subsystem is configured to:
  receive, from the central processing subsystem, a first processor memory-centric access request associated with a first memory access operation;
  determine, using memory management hardware included in the clustered memory management subsystem, that the first processor memory-centric access request is directed to the second memory subsystem in the second computing system;
  generate, using remote memory access hardware included in the clustered memory management subsystem, first memory access information for performing the first memory access operation at the second memory subsystem; and
  instruct the networking device to utilize the first memory access information to perform the first memory access operation at the second memory subsystem to cause the networking device to transmit at least one first memory access communication that provides for the performance of the first memory access operation at the second memory subsystem.

2. The system of claim 1, wherein the first processor memory-centric access request includes a memory subsystem address pointer that points to a memory address associated with the second memory subsystem.

3. The system of claim 1, wherein the clustered memory management subsystem is configured to:
  receive, from the central processing subsystem, a second processor memory-centric access request associated with a second memory access operation;
  determine, using the memory management hardware included in the clustered memory management subsystem, that the second processor memory-centric access request is directed to a first memory subsystem included in the clustered memory management subsystem; and
  perform the second memory access operation at the first memory subsystem.

4. The system of claim 1, wherein the clustered memory management subsystem is configured to:
  generate, prior to receiving the first processor memory-centric access request, a global memory address map that identifies memory addresses included in the second memory subsystem in the second computing system.

5. The system of claim 1, wherein the first memory access information is Remote Direct Memory Access (RDMA) information.

6. The system of claim 1, wherein the clustered memory management subsystem is configured to:
  receive, from the second computing system via the networking device, a memory access operation completion status communication associated with the first memory access operation; and
  transmit, to the central processing subsystem based on the memory access operation completion status communication, a memory access completion status.

7. An Information Handling System (IHS), comprising:
  an Information Handling System (IHS) chassis;
  a secondary processing subsystem that is included in the IHS chassis; and
  a secondary memory subsystem that is included in the IHS chassis, that is coupled to the secondary processing subsystem, and that includes instructions that, when executed by the secondary processing subsystem, cause the secondary processing subsystem to provide a clustered memory management engine that is configured to:
    receive, from a central processing subsystem that is included in the IHS chassis, a first processor memory-centric access request associated with a first memory access operation;
    determine, using memory management hardware included in the secondary processing subsystem, that the first processor memory-centric access request is directed to a first memory subsystem in a first computing system that is included in a first computing system chassis that is separate from the IHS chassis and that coupled to the secondary processing subsystem via a network;
    generate, using remote memory access hardware included in the secondary processing subsystem, first memory access information for performing the first memory access operation at the first memory subsystem; and
    instruct a networking device that is included in the IHS chassis and coupled to the secondary processing subsystem to utilize the first memory access information to perform the first memory access operation at the first memory subsystem to cause the networking device to transmit at least one first memory access communication that provides for the performance of the first memory access operation at the first memory subsystem.

8. The IHS of claim 7, wherein the first processor memory-centric access request includes a memory subsystem address pointer that points to a memory address associated with the first memory subsystem.

9. The IHS of claim 7, wherein the clustered memory management engine is configured to:
  receive, from the central processing subsystem, a second processor memory-centric access request associated with a second memory access operation;
  determine, using the memory management hardware included in the secondary processing subsystem, that the second processor memory-centric access request is directed to the secondary memory subsystem connected to the secondary processing subsystem; and
  perform the second memory access operation at the secondary memory subsystem.

10. The IHS of claim 7, wherein the clustered memory management engine is configured to:
  generate, prior to receiving the first processor memory-centric access request, a global memory address map that identifies memory addresses included in the first memory subsystem in the first computing system.

11. The IHS of claim 7, wherein the first memory access information is Remote Direct Memory Access (RDMA) information.

12. The IHS of claim 7, wherein the clustered memory management engine is configured to:
  receive, from the first computing system via the networking device, a memory access operation completion status communication associated with the first memory access operation; and
  transmit, to the central processing subsystem based on the memory access operation completion status communication, a memory access completion status.

13. The IHS of claim 7, wherein the clustered memory management engine is configured to use the remote memory access hardware included in the secondary processing subsystem to generate the first memory access information for performing the memory access operation at the first memory subsystem by:
  accessing memory subsystem offset information; and using the memory subsystem offset information to convert a first memory address included in the first processor memory-centric access request to a second memory address that is provided in the first memory access information.

14. A method for providing clustered memory, comprising:
receiving, by a clustered memory management subsystem that is included in a second computing system chassis from a central processing subsystem that is included in the second computing system chassis, a first processor memory-centric access request associated with a first memory access operation;
determining, by the clustered memory management subsystem using memory management hardware, that the first processor memory-centric access request is directed to the first memory subsystem in a first computing system that is included in a first computing system chassis that is separate from the second computing system chassis;
generating, by the clustered memory management subsystem using remote memory access hardware, first memory access information for performing the first memory access operation at the first memory subsystem; and
instructing, by the clustered memory management subsystem, a networking device that is included in the first computing system chassis to utilize the first memory access information to perform the first memory access operation at the first memory subsystem to cause the networking device to transmit at least one first memory access communication that provides for the performance of the first memory access operation at the first memory subsystem.

15. The method of claim 14, wherein the first processor memory-centric access request includes a memory subsystem address pointer that points to a memory address associated with the first memory subsystem.

16. The method of claim 14, further comprising:
receiving, by the clustered memory management subsystem from the central processing subsystem, a second processor memory-centric access request associated with a second memory access operation;
determining, by the clustered memory management subsystem using the memory management hardware, that the second processor memory-centric access request is directed to a second memory subsystem included in the clustered memory management subsystem; and
performing the second memory access operation at the second memory subsystem.

17. The method of claim 14, further comprising:
generating, by the clustered memory management subsystem prior to receiving the first processor memory-centric access request, a global memory address map that identifies memory addresses included in the first memory subsystem in the first computing system.

18. The method of claim 14, wherein the first memory access information is Remote Direct Memory Access (RDMA) information.

19. The method of claim 14, further comprising:
receiving, by the clustered memory management subsystem from the first computing system via the networking device, a memory access operation completion status communication associated with the first memory access operation; and
transmitting, by the clustered memory management subsystem to the central processing subsystem based on the memory access operation completion status communication, a memory access completion status.

20. The method of claim 14, wherein the clustered memory management subsystem uses the remote memory access hardware to generate the first memory access information for performing the memory access operation at the first memory subsystem by:
accessing memory subsystem offset information; and
using the memory subsystem offset information to convert a first memory address included in the first processor memory-centric access request to a second memory address that is provided in the first memory access information.

* * * * *